United States Patent [19]
Gardner et al.

[11] Patent Number: 5,554,454
[45] Date of Patent: Sep. 10, 1996

[54] SOLID OXIDE FUEL CELL STACK

[75] Inventors: Frederick J. Gardner; Michael J. Day, both of Derby; Nigel P. Brandon, Leicestershire; John B. Brownell, Derbyshire, all of England

[73] Assignee: Rolls-Royce plc, London, England

[21] Appl. No.: 392,545

[22] Filed: Feb. 16, 1995

[30] Foreign Application Priority Data

Feb. 19, 1994 [GB] United Kingdom .................. 9403234

[51] Int. Cl.$^6$ ................................................. H01M 8/10
[52] U.S. Cl. .................. 429/19; 429/32; 429/39
[58] Field of Search ............................ 429/38, 39, 30, 429/34, 35, 32, 19, 13

[56] References Cited

U.S. PATENT DOCUMENTS

| | | | |
|---|---|---|---|
| 4,182,795 | 1/1980 | Baker et al. | 429/13 |
| 4,510,212 | 4/1985 | Fraioli | 429/30 |
| 4,518,664 | 5/1985 | Whittlesey et al. | 429/38 |
| 4,647,516 | 3/1987 | Matsumura et al. | 429/19 |
| 4,788,110 | 11/1988 | Bernard | 429/19 |
| 4,816,036 | 3/1989 | Kotchick | 429/30 X |
| 4,913,982 | 4/1990 | Kotchick et al. | 429/30 X |
| 4,933,242 | 6/1990 | Koga et al. | 429/19 |
| 5,049,458 | 9/1991 | Sato et al. | 429/38 X |
| 5,145,754 | 9/1992 | Misawa et al. | 429/30 X |
| 5,162,167 | 11/1992 | Minh et al. | 429/30 |
| 5,286,579 | 2/1994 | Akagi | 429/39 X |

FOREIGN PATENT DOCUMENTS

| | | |
|---|---|---|
| 0067423 | 12/1982 | European Pat. Off. . |
| 0481813 | 4/1992 | European Pat. Off. . |

*Primary Examiner*—Anthony Skapars
*Attorney, Agent, or Firm*—Cushman Darby & Cushman, L.L.P.

[57] ABSTRACT

A solid oxide fuel cell stack includes a core region which comprises a plurality of first modules and a plurality of second modules stacked alternately. Each first module comprises a first distribution member formed from two corrugated ceramic plates which define internal passages for the supply of a first reactant to the fuel cells. The first distribution member is enclosed by a porous support structure which carries the fuel cells on its two parallel surfaces. A plurality of passages are defined between the porous support structure and the first distribution member which distribute and remove the first reactant from the anodes. Each second module comprises a second distribution member formed from two corrugated ceramic plates which define internal passages for the supply of a second reactant to the fuel cells. A plurality of passages are defined between the fuel cells and the second distribution member which distribute and remove the second reactant from the cathodes.

43 Claims, 15 Drawing Sheets

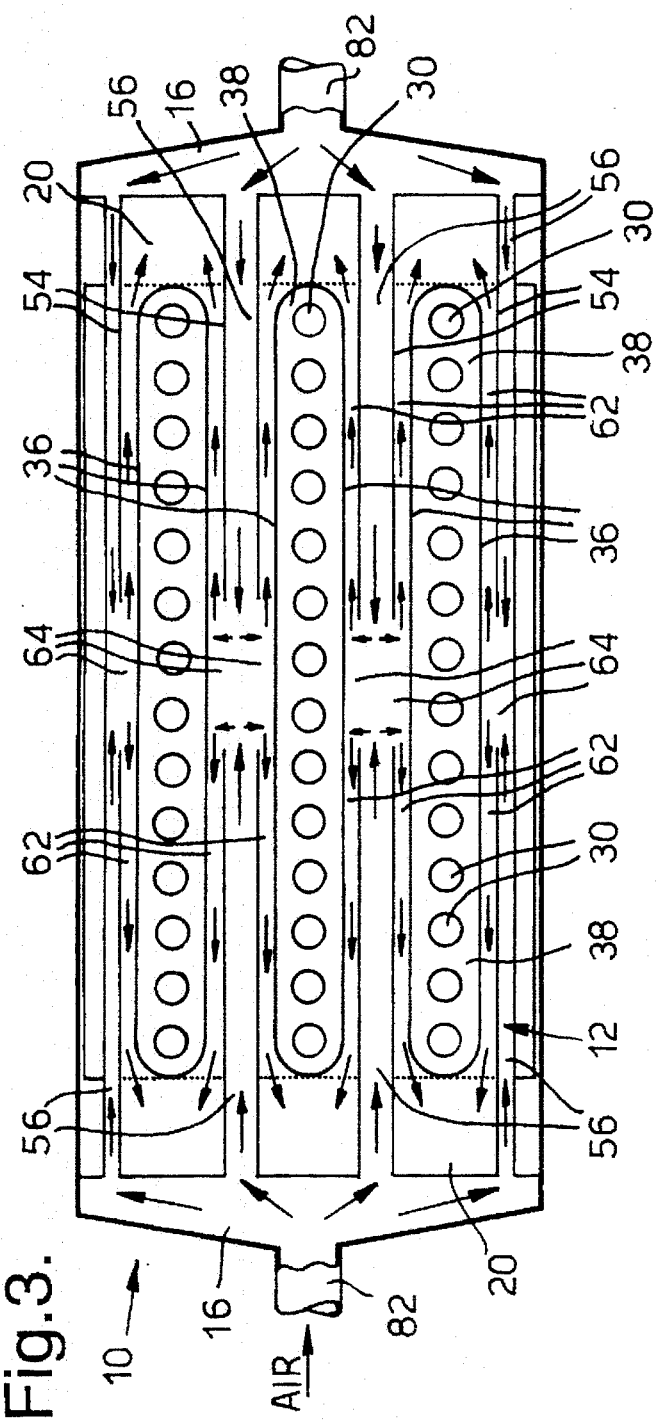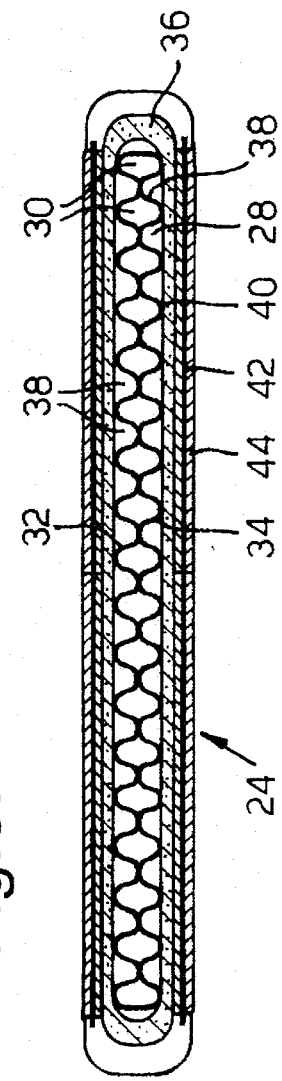

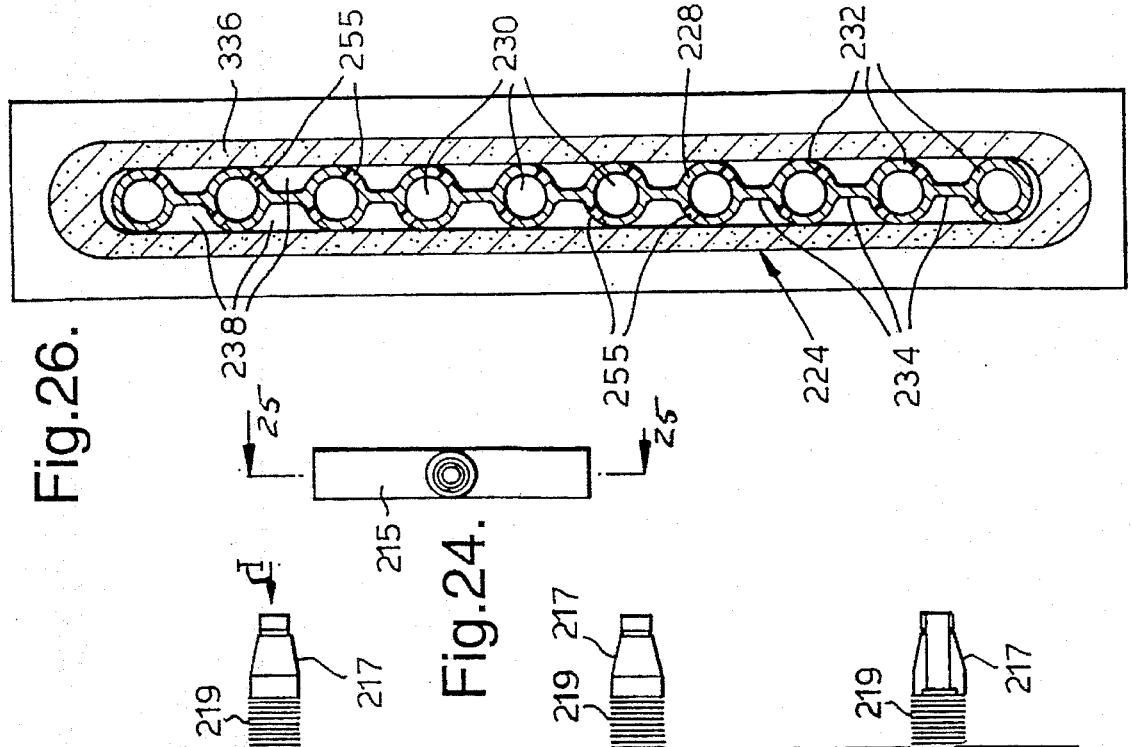
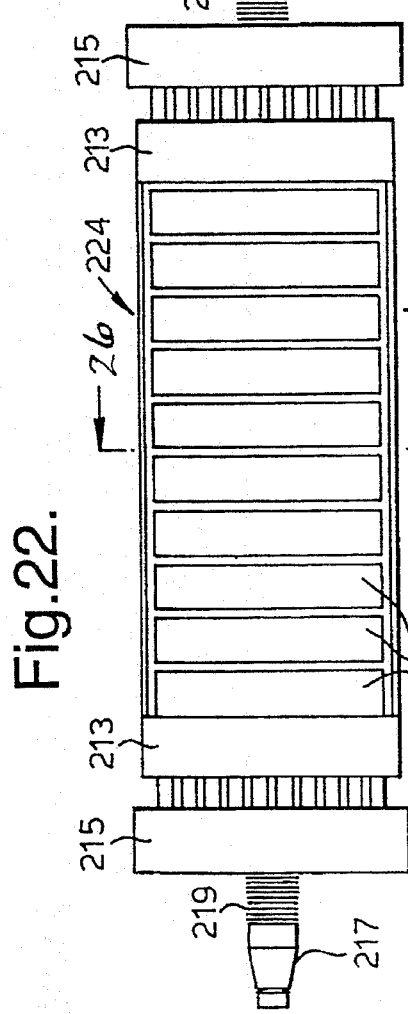
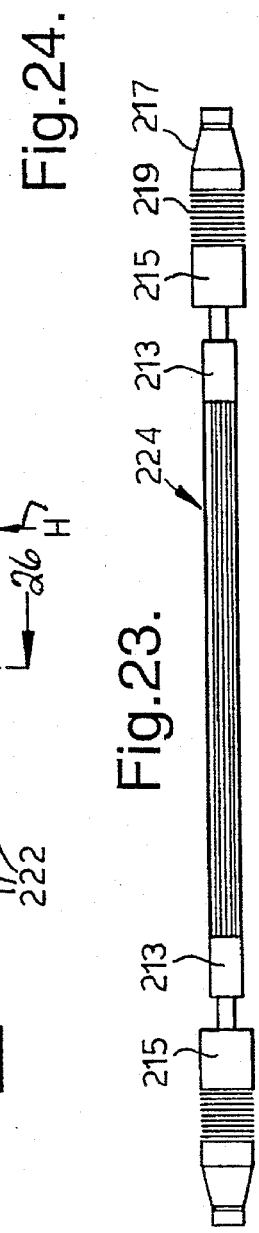
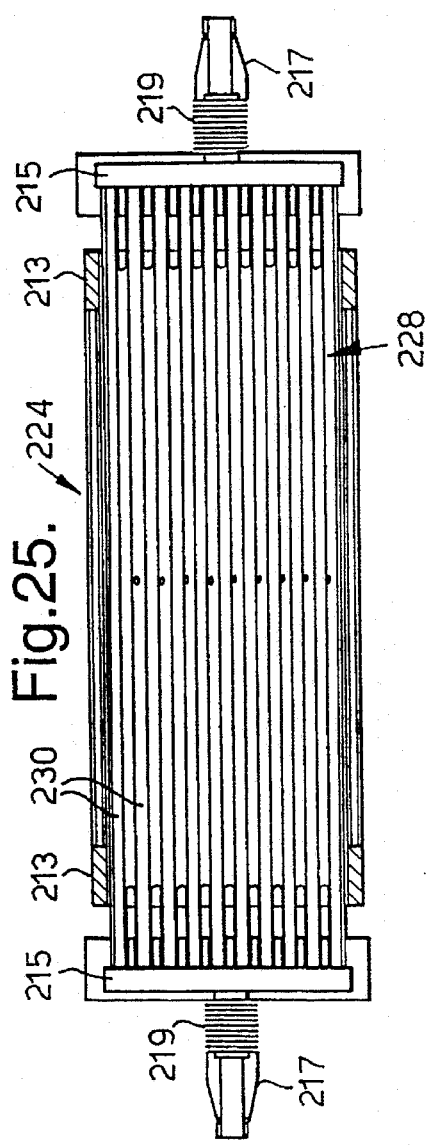

SOLID OXIDE FUEL CELL STACK

FIELD OF THE INVENTION

The present invention relates to solid oxide fuel cells.

BACKGROUND OF THE INVENTION

Currently the main variants of the solid oxide fuel cell are the tubular solid oxide fuel cell (T-SOFC), the planar solid oxide fuel cell (P-SOFC) and the monolithic solid oxide fuel cell (M-SOFC).

The tubular solid oxide fuel cell comprises a tubular solid oxide electrolyte member which has inner and outer electrodes. Typically the inner electrode is the cathode and the outer electrode is the anode. An oxidant gas is supplied to the cathode in the interior of the tubular solid oxide electrolyte member and a fuel gas is supplied to the anode on the exterior surface of the tubular solid oxide electrolyte member. The tubular solid oxide fuel cell allows a simple cell stacking arrangement and is substantially devoid of seals. However, the fabrication of this type of solid oxide fuel cell is very sophisticated, manpower intensive and costly. Also this type of solid oxide fuel cell has a relatively low power density due to long current conduction paths through the relatively large diameter tubular cells.

The monolithic solid oxide fuel cell has two variants. The first variant has a planar solid oxide electrolyte member which has electrodes on its two major surfaces. The second variant has a corrugated solid oxide electrolyte member which has electrodes on its two major surfaces. The monolithic solid oxide fuel cell is amenable to the more simple tape casting and calendar rolling fabrication processes and promises higher power densities. This type of solid oxide fuel cell requires the co-sintering of all the fuel cell layers in the monolith from their green states. However, this results in serious shrinkage and cracking problems. This type of solid oxide fuel cell is not so easy to manifold and seal.

The planar solid oxide fuel cell is also amenable to tape casting and calendar rolling fabrication processes. Currently it requires thick, 150–200 microns, self supported solid oxide electrolyte members which limit performance. The planar solid oxide fuel cell also has limited thermal shock resistance.

Solid oxide fuel cells require operating temperatures of around 1000° C. to maintain low internal electrical resistances.

The operating temperature of a solid oxide fuel cell stack is in principle high enough for steam reforming of a hydrocarbon fuel internally of the solid oxide fuel cell stack. Internal steam reforming would simplify the balance of a solid oxide fuel cell power system and improve operating efficiency. However, reforming of a hydrocarbon fuel within the solid oxide fuel cell stack has a number of problems which have not been overcome. Full internal reforming of the hydrocarbon fuel in solid oxide fuel cell stacks is precluded by the strongly endothermic nature of the steam reforming reaction, and consequential thermal shocking of the delicate fuel cells. Internal reforming on nickel cermet anodes in solid oxide fuel cells tends to catalyse carbon formation.

The present invention seeks to provide a novel solid oxide fuel cell stack which is amenable to simple manufacturing procedures and which is relatively simple to manifold and seal.

Accordingly the present invention provides a solid oxide fuel cell stack comprising at least one first module and at least one second module, each first module comprising a first distribution means defining a plurality of first passages for the supply of a first reactant longitudinally relative to the first distribution means, at least one electrolyte/electrode assembly arranged to be carried on one side of the first distribution means, the at least one electrolyte/electrode assembly and the first distribution means defining a plurality of second passages therebetween, the second passages extending longitudinally relative to the first distribution means for the distribution of first reactant and the removal of spent first reactant, each electrolyte/electrode assembly comprising a plurality of first electrodes, a plurality of solid oxide electrolyte members and a plurality of second electrodes, each solid oxide electrolyte member being positioned between and contacting a respective one of the first electrodes and a respective one of the second electrodes to form a fuel cell, at least one interconnector to connect the first electrode of one fuel cell with the second electrode of an adjacent fuel cell, the first electrodes on each electrolyte/electrode assembly facing the first distribution means, each second module comprising a second distribution means defining a plurality of third passages for the supply of a second reactant longitudinally relative to the second distribution means, the at least one first module being arranged in proximity to the at least one second module such that the at least one electrolyte/electrode assembly and the second distribution means define a plurality of fourth passages therebetween, the fourth passages extending longitudinally relative to the second distribution means for the distribution of second reactant and the removal of spent second reactant, the second electrodes on each electrolyte/electrode assembly facing the second distribution means, means to supply first reactant to the first passages, and means to supply second reactant to the third passages.

Preferably each first module has two electrolyte/electrode assemblies arranged to be carried on opposite sides of the first distribution means.

Preferably the first distribution means or the second distribution means define a plurality of parallel first passages or a plurality of parallel third passages respectively, the axes of the parallel first passages in the first distribution means or the axes of the parallel third passages in the second distribution means are arranged in a plane.

The first distribution means or the second distribution means may be defined by first and second corrugated plates, the troughs of the first corrugated plate are bonded to the peaks of the second corrugated plate to define the first passages or third passages respectively, at least one of the corrugated plates has apertures extending therethrough to supply reactant from the first passages or third passages respectively to the respective electrodes.

Preferably the first distribution means or the second distribution means are defined by a plurality of parallel tubes to define the first passages or third passages respectively, the tubes are interconnected by spacing members, the tubes have apertures extending therethrough to supply reactant from the first passages or third passages respectively to the respective electrodes.

Preferably the apertures are midway between the ends of the passages of the first distribution means or the second distribution means.

The first distribution means or the second distribution means may be defined by a plurality of parallel tubes to define the first passages or third passages respectively, the tubes are interconnected by spacing members.

Preferably the first distribution means or the second distribution means is formed from a ceramic material.

Preferably each first module includes a porous support structure extending transversely around the first distribution means, the porous support structure contacting the first distribution means at transversely spaced locations of the first distribution means to define the plurality of second passages between the first distribution means and the porous support structure, the porous support structure carrying the at least one electrolyte/electrode assembly, the first electrodes being arranged on and contacting the porous support structure.

The first electrodes may be arranged on substantially parallel surfaces of the porous support structure, the first electrodes on each of the parallel surfaces of the porous support structure are connected electrically in series to the second electrode of an adjacent fuel cell.

The fuel cells on the two parallel surfaces of the porous support structure may be connected electrically in parallel.

Preferably the first electrodes, the solid electrolyte members and the second electrodes extend transversely of the first distribution means, the adjacent first electrodes are spaced apart longitudinally of the first distribution means.

The first electrodes, the solid electrolyte members and the second electrodes may extend longitudinally of the first distribution means, the adjacent first electrodes are be spaced apart transversely of the first distribution means.

The first electrodes may be anodes and the second electrodes are cathodes.

The solid oxide fuel cell stack may comprise a plurality of first modules and a plurality of second modules are provided, the first and second modules being arranged alternately.

Preferably the solid oxide fuel cell stack comprises a plurality of first modules and a plurality of second modules, each first module being arranged alternately with two second modules.

Preferably the first and second distribution means are arranged such that the first and third passages extend perpendicularly.

Preferably each first module has means to supply first reactant to both ends of the first passages.

Each second module may have means to supply second reactant to both ends of the third passages.

Preferably both ends of the first passages of each first module are supplied with fuel from a pair of secondary first reactant manifolds, the secondary first reactant manifolds are connected to opposite ends of the first passages.

Preferably each secondary first reactant manifold is connected to a primary first reactant manifold.

Preferably each secondary first reactant manifold is connected to the primary first reactant manifold by a compliant connection.

Preferably the compliant connection comprises a pipe having a tube like bellow portion or a looped portion.

Preferably the opposite ends of the first modules are located in compliant seals which allow the first modules to move longitudinally.

Preferably the both of the compliant seals comprises a plurality of seal segments, each seal segment is shaped on at least one edge to fit around the opposite ends of one or more first modules.

Preferably the seal segments of each compliant seal are located in a respective removable frame.

Preferably the compliant seals comprise gland type seals between the ends of the first modules and the seal segments.

Preferably the first reactant is a hydrogen containing gas and the second reactant is an oxygen containing gas.

BRIEF DESCRIPTION OF THE DRAWINGS

The present invention will be more fully described by way of examples with reference to the accompanying drawings, in which:

FIG. 3 is a cross-sectional view in the direction of arrows A—A in FIG. 1.

FIG. 5 is a cross-sectional view through the module shown in FIG. 4.

FIG. 22 is a plan view of a first module forming part of the solid oxide fuel cell stack shown in FIGS. 19, 20 and 21.

FIG. 23 is a view in the direction of arrow H in FIG. 22.

FIG. 24 is a view in the direction of arrow I in FIG. 23.

FIG. 25 is a cross-sectional view in the direction of arrows J—J in FIG. 24.

FIG. 26 is an enlarged cross-sectional view in the direction of arrows K—K in FIG. 22.

DETAILED DESCRIPTION OF THE INVENTION

Figure 1:
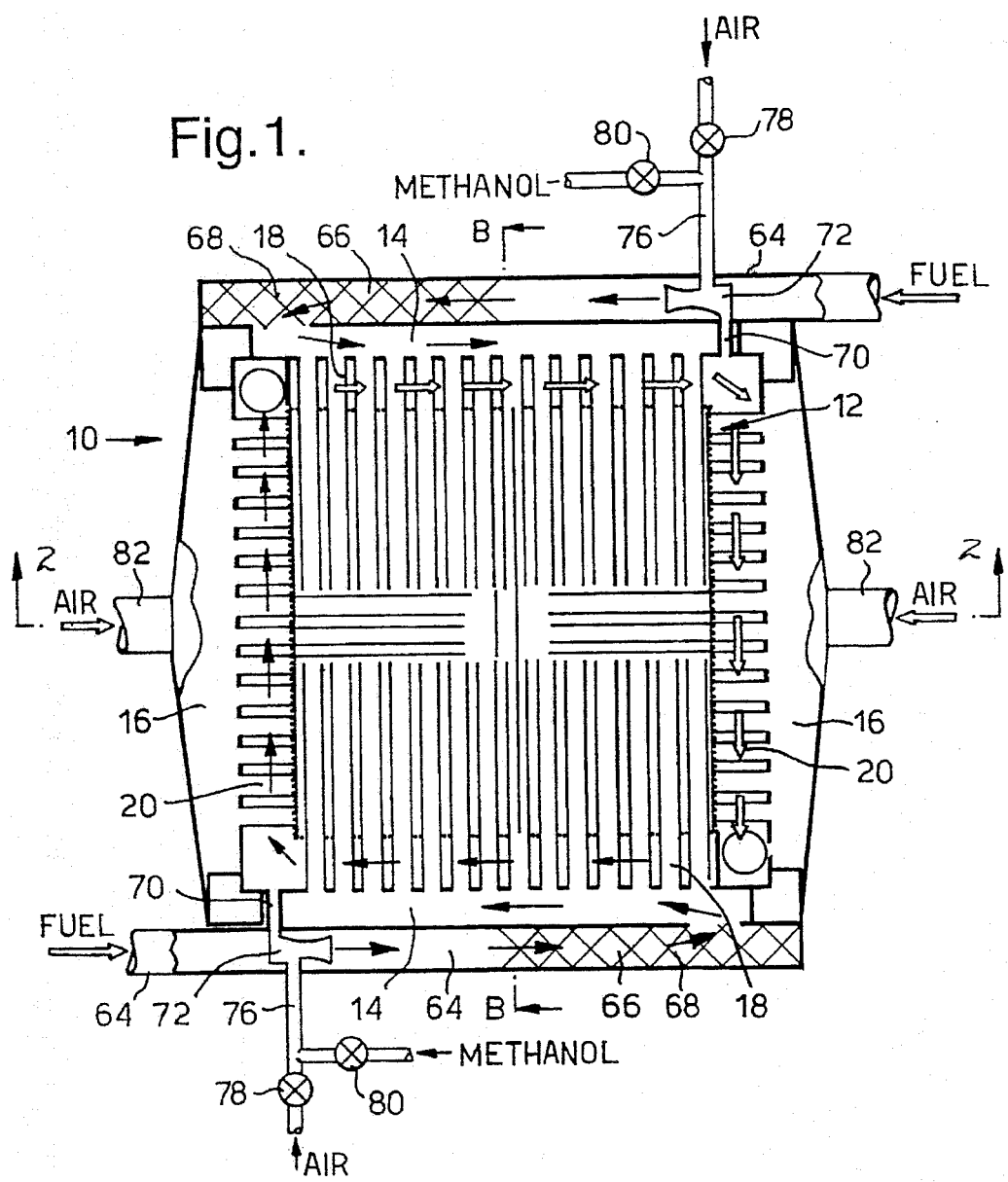
FIG. 1 is a schematic cross-sectional view through a solid oxide fuel cell stack according to the present invention.
Figure 2:
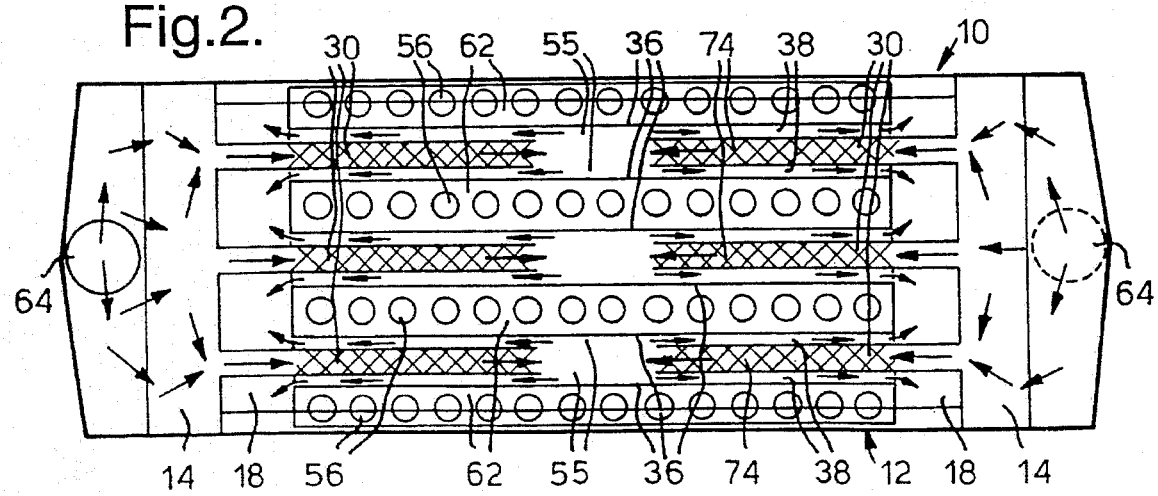
FIG. 2 is a cross-sectional view in the direction of arrows B—B in FIG. 1.

A solid oxide fuel cell stack 10 according to the present invention is shown in FIGS. 1 to 3. The solid oxide fuel cell stack 10 comprises a core region 12 which contains an array of solid oxide fuel cells 22. The core region 12 is surrounded by fuel supply manifolds 14, oxidant supply manifolds 16, spent fuel collection manifolds 18 and spent oxidant collection manifolds 20.

The solid oxide fuel cells 22 are carried on one or more first modules 24, as shown in FIGS. 4, 5, 6, 7 and 8, which form one of the basic units from which the core region 12 of the solid oxide fuel cell stack 10 is constructed. The core region 12 also comprises one or more second modules 26 which are the other basic units of the core region of the solid oxide fuel cell stack 10.

Each of the first modules 24 comprises a first reactant distribution member 28 which defines a plurality of parallel first passages 30 for the supply of a first reactant longitudinally of the first distribution member 28. The axes of the first passages 30 lie in a common plane. The first reactant distribution member 28 is preferably manufactured from two corrugated ceramic plates 32,34 in which the corrugations of the plates 32,34 are arranged parallel and the troughs of one of the plates 32 are bonded to the peaks of the other plate 34. The diameter of the first passages is of the order of 2 mm. A porous support structure 36 surrounds the first distribution member 28, extends transversely of the first distribution member 28 and contacts the peaks of plate 32 and the troughs of plate 34 to define a plurality of parallel second passages 38 for the distribution of fresh first reactant and the removal of spent first reactant from the solid oxide fuel cells 22. The second passages 38 are in fact the anode, or cathode, chambers of the solid oxide fuel cell stack 10. The corrugated ceramic plates 32,34 have apertures 55 substantially midway between the ends of the first passages 30 to allow the first reactant to flow from the first passages 30 into the second passages 38 to supply the first reactant to the anode, or cathode, chambers of the solid oxide fuel cells.

The porous substrate 36 carries a plurality of series connected solid oxide fuel cells 22 on its two parallel flat surfaces.

Figure 8:
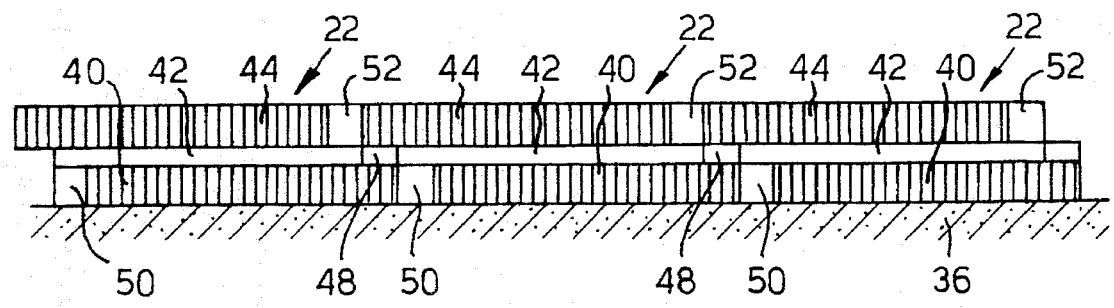
FIG. 8 is an enlarged cross-sectional view of part of FIG. 7D and 7E.
Figure 9:
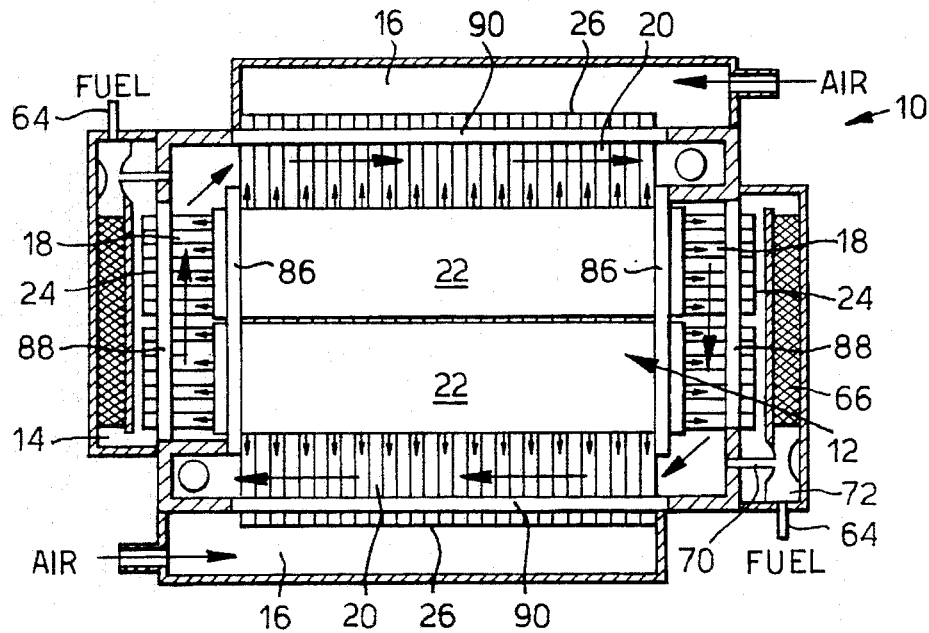
FIG. 9 is cross-sectional view through the core region of the solid oxide fuel cell stack showing the seals.

Each of the solid oxide fuel cells 22, as shown in FIG. 8, comprises a first electrode 40, anode or cathode, which contacts and is carried by the porous substrate 36, a solid oxide electrolyte member 42 which contacts the first electrode 40 and a second electrode 44, cathode or anode, which contacts the opposite face of the solid oxide electrolyte member 42. The first electrode 40 of one solid oxide fuel cell 22 is electrically connected to the second electrode of an adjacent solid oxide fuel cell 22 by an interconnector 48. Adjacent first electrodes 40 are separated by insulators 50 and adjacent second electrodes 44 are separated by insulators 52. Preferably it is possible to dispense with the insulators 52 and to form the insulators 50 as extensions of the electrolyte members 42. A barrier layer is preferably provided under the interconnectors 48 and adjacent regions of the electrodes 40 to prevent the interconnectors 48 being attacked by fuel gas. The interconnectors 48 are preferably stainless steel, stainless steel other metallic alloys, eg nickel chromium alloys overlaid with an oxide coating or doped lanthanum chromite oxide and a sealing film. The barrier layer is preferably dense yttria stabilised zirconia.

Each of the second modules 26, as shown in FIG. 6, comprises a second reactant distribution member 54 which defines a plurality of parallel third passages 56 for the supply of a second reactant longitudinally of the second distribution member 54. The axes of the third passages 56 lie in a common plane. The second reactant distribution member 54 is preferably manufactured from two corrugated ceramic plates 58,60 in which the corrugations of the plates 58,60 are arranged parallel and the troughs of one of the plates 58 are bonded to the peaks of the other plate 60. The diameter of the third passages 56 is also of the order of 2 mm. The second distribution member 54 is in close proximity to the second electrodes 44 on the first modules 24, and the second electrodes 44 of one first module 24 contact the peaks of plate 58 and the second electrodes of an adjacent first module 24 contact the troughs of plate 60 to define a plurality of parallel fourth passages 62 for the distribution of fresh second reactant and the removal of spent second reactant from the solid oxide fuel cells 22. The fourth passages 62 are in fact the cathode, or anode, chambers of the solid oxide fuel cell stack 10. The corrugated ceramic plates 58,60 have apertures 64 substantially midway between the ends of the third passages 56 to allow the second reactant to flow from the third passages 56 into the fourth passages 62 to supply the second reactant to the cathode, or anode, chambers of the solid oxide fuel cells.

Thus it can be seen, from FIG. 6, that the first modules 24 and the second modules 26 are stacked alternately in the core region 12 of the solid oxide fuel cell stack 10. It is preferred that the first and second modules 24,26 are stacked such that the first and second passages 30,38 are arranged perpendicular to the third and fourth passages 56,62, however it may be possible to arrange these passages parallel to each other.

Referring to FIG. 1 to 3 it is seen that both ends of each first passage 30, within the first reactant distribution member 28, are supplied with first reactant, fuel. The opposite ends of the first passages 30 are supplied with fuel from respective separate fuel supply manifolds 14. Both ends of each second passage 38 discharge spent first reactant, fuel, into spent fuel collection manifolds 18. The opposite ends of the second passages 38 discharge spent fuel into respective separate spent fuel collection manifolds 18. The spent fuel collection manifolds 18 are positioned between the fuel supply manifolds 14 and the core region 12. Thus the ends of the first distribution member 28 pass through the spent fuel collection manifolds 18 on their way to the core region 12. Similarly both ends of each third passage 56, within the second reactant distribution member 54, are supplied with second reactant, oxidant. The opposite ends of the third passages 56 are supplied with oxidant from respective separate oxidant supply manifolds 16. Both ends of each fourth passage 62 discharge spent second reactant, oxidant, into spent oxidant collection manifolds 20. The opposite ends of the fourth passages 62 discharge spent oxidant into respective separate spent oxidant collection manifolds 20. The spent oxidant collection manifolds 20 are positioned between the oxidant supply manifolds 16 and the core region 12. Thus the ends of the second distribution member 54 pass through the spent oxidant collection manifolds 20 on their way to the core region 12. This arrangement allows sensible heat in the hot spent reactants to be recuperated to the fresh reactant supplies.

The fuel supply manifolds 14 are supplied with fuel via pipes 64 from a fuel supply (not shown). The fuel supply may be a supply of hydrogen or a supply of hydrocarbon fuel. If the fuel supplied is hydrogen the fuel supply may be hydrogen from a hydrogen store, or it may be a reformer which reforms a hydrocarbon fuel into hydrogen and other product gases. Preferably the fuel supply is a hydrocarbon fuel as in this example and the fuel supply pipes 64 contain prereformers 66 which contain a catalyst 68 suitable for low temperature steam reforming of the hydrocarbon fuel into methane, hydrogen and oxides of carbon. The prereformers 66 adiabatically steam reform approximately 5 to 20% of the hydrocarbon fuel into methane, hydrogen and oxides of carbon. Also the prereformers 66 may contain guard means to remove, or trap, sulphur based, chlorine based and other impurities in the hydrocarbon fuel. The prereformers 66 are removably mounted on the solid oxide fuel cell stack 10. The guard means for removal of chlorine comprises activated alumina. The guard means for removal of sulphur comprises zinc oxide. The prereformer 66 contains a hydrodesulphurisation catalyst, for example nickel molybdate or cobalt molybdate, a low temperature steam reforming catalyst, for example a highly active nickel catalyst and a partial oxidation catalyst, for example platinum, rhodium or other precious metals or mixtures of the precious metals to promote start up at low temperatures.

Also ducts 70 connect the spent fuel collection manifolds 18 with the pipes 64, upstream of the prereformers 66, such that a portion, approximately two thirds, of the spent fuel/anode gas stream, containing product steam etc, is recirculated to facilitate steam reforming of the hydrocarbon fuel. A hydrocarbon fuel driven jet pump 72, or other injector, is provided to induce the recirculation of the spent fuel/anode gas stream.

Furthermore the first passages 30 of the first distribution member 28 are coated with a suitable catalyst 74 or contain a suitable catalyst 74 for steam reforming of the remaining hydrocarbon fuel into hydrogen and other product gases. The temperature of the fuel is raised to approximately 700°–800° C. in the first passages 30 by heat transfer from the fuel cells 22 through the first distribution tubes 28.

The remaining portion, approximately one third, of the spent fuel/anode gas passes through the spent oxidant collection manifolds 20 where it is combusted in the spent oxidant, further heating the oxidant supplied to the solid oxide fuel cells 22.

Air supply pipes 76 are provided to supply air into the fuel driven jet pumps 72 for start up of the solid oxide fuel cell by stack 10 by partial oxidation reforming of the hydrocarbon fuel in the prereformer 66. The pipes 76 have valves 78 to control the flow of air into the jet pumps 72. Hydrogen, or methanol, is supplied into the air supplied through pipes 76. The pipes 76 have valves 80, or other means to control the addition of hydrogen, or methanol, into the air supplied through pipes 76. Methanol may be added to the air by bubbling the air through methanol, or by injecting a fine spray of methanol into the air.

The oxidant supply manifolds 16 are supplied with oxidant via pipes 82 from an oxidant supply (not shown). The oxidant supply may be a supply of oxygen or a supply of air.

The first and second distribution members 28 and 54 are manufactured by firstly making the individual corrugated ceramic plates. Each corrugated ceramic plate is made by calendar rolling, or tape casting, the ceramic plate. The ceramic plate is then pressed in a die to form a corrugated ceramic plate. Two corrugated ceramic plates are hot pressed together, or rolled together, while in the green state to produce the green distribution member. Slots are cut midway between the ends of the green distribution member in order to produce the apertures in the finished distribution member. The green distribution member is then sintered after burning out any organics to produce the finished distribution member 28 or 54 see FIG. 7A. The first and second distribution members 28 and 54 are fabricated from fully or partially stabilised zirconia, alumina, silicon carbide or other suitable ceramic material.

Figure 7A:
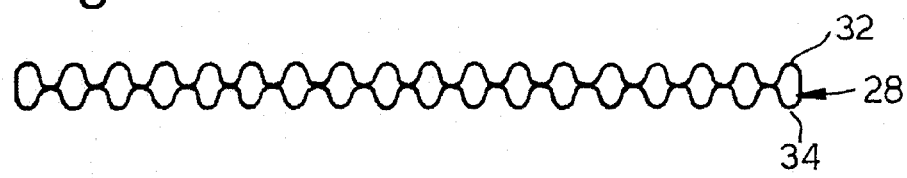
FIGS. 7A to 7C and 7E are cross-sectional views through the module shown in FIG. 4.
Figure 7B:
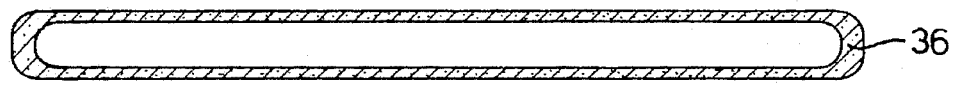
Figure 7C:
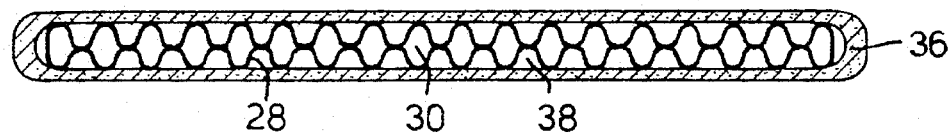

The first distribution member 28 is surrounded by the porous substrate 36 as in FIG. 7B. The porous substrate 36, as shown in FIG. 7B, may be manufactured by soaking a suitable organic foam, for example polyurethane, in a slurry containing partially or fully stabilised zirconia, alumina or other suitable ceramic. The organic foam, impregnated with the ceramic slurry, is pressed, or rolled, to the desired thickness before being wrapped around a suitable former to give it its near net final shape. The porous substrate is dried and the organic foam is burned away before sintering. The first distribution member 28 is then pushed through the porous substrate to produce an unbonded structure as seen in FIG. 7C. Alternatively the organic foam, impregnated with the ceramic slurry, is pressed, or rolled, to the desired thickness before being wrapped around the green first distribution member. The two are then co-sintered to form a bonded structure. The preferred ceramic is 2.5 or 8 mol % yttria stabilised zirconia. The porous substrate 36 is preferably manufactured from ceramic paper or fibre board, formed into the correct shape, or from calendered or extruded ceramic tape containing pore forming elements. The pore forming elements are small particles of carbon which burn out on firing to leave a porous structure. The ceramic tape is wrapped around the first distribution member 28, or suitable former, prior to firing. A further option is to extrude the porous substrate using a ceramic paste containing the pore forming organic solid particles. The extruded ceramic paste is then fired. Barrier layers of porous ceramic, eg zirconia may be deposited onto these, by for example plasma spraying, to prevent chemical interactions.

Figure 7D:
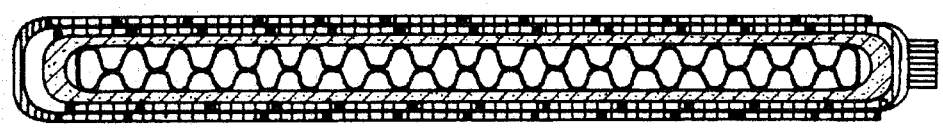
FIG. 7D is a cross-sectional view through an alternative module.
Figure 7E:
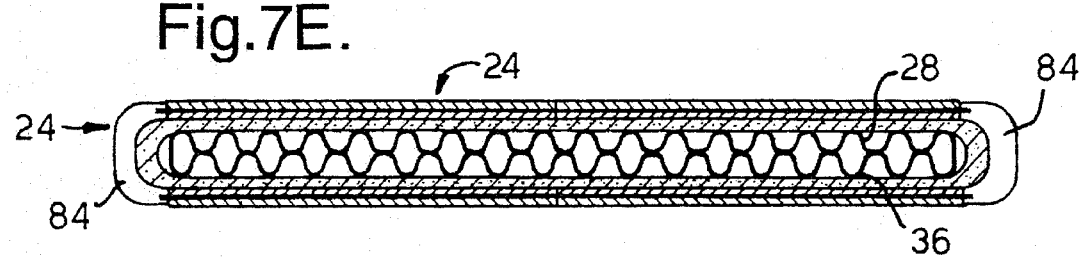

The solid oxide fuel cell electrolyte member 42 and electrodes 40, 44 are deposited onto the two parallel flat surfaces of the porous substrate 36 by screen printing, transfer printing, electrophoretic deposition, thermal spraying or vapour deposition as seen in FIG. 7E. In the screen printing process, firstly the electrodes 40 are deposited onto the porous substrate 36, if the electrodes 40 are anodes, typically using an ink for the screen printing process of partially yttria stabilised zirconia and nickel oxide powders in an organic vehicle. Secondly the electrolyte members 42 are deposited onto the first electrodes 40, using an ink for the screen printing process of yttria stabilised zirconia in an organic vehicle. Thirdly interconnectors 48 are deposited onto the exposed surfaces of the first electrodes 40, using an ink for the screen printing process of typically doped lanthanum chromite in an organic vehicle. Finally the electrodes 44 are deposited onto the electrolyte members 42 and interconnectors 48, if the electrodes 44 are cathodes using an ink for the screen printing process of typically doped lanthanum manganite in an organic vehicle. Between each deposition step the layers are dried at room temperature and heated to remove the remaining solvent used as the organic vehicle. The electrodes 40 and electrolyte members 42 are sintered together at 1400°–1450° C. for 1 hour. The interconnectors 48 are sintered after their deposition using rastering of a laser beam or electron beam across the interconnectors 48 to induce a localized temperature of 1300° C. to 2000° C. The electrodes 44 are sintered at 1000° C. to 1400° C. for 1 hour.

The curved edges of the porous substrate 36 are sealed by a suitable glass/ceramic slurry sealant 84, as shown in FIG. 7E, which fills the fine pores of the porous substrate 36 by capillary action. The sealant is dried and sintered to form a permanent seal. These edge seals, together with the electrolyte members 42, and electrodes 40 and 44 on the flat surfaces of the porous substrate 36 form a gas tight boundary around the first distribution member 28.

There are a plurality of fuel cells 22 on each surface of the porous substrate 36 which are connected electrically in series. The individual fuel cells are oriented across the direction of flow fuel flow so that the variation in fuel concentration over individual cells is a small fraction of the change in fuel concentration over the whole multi-cell arrangement. This enables high D.C. voltage generation, high fuel utilisation efficiency if the pitch of the fuel cells is made sufficiently low, and reduced requirement for interconnect material.

FIGS. 9 to 14 illustrate the seals used in the solid oxide fuel cell stack 10. Seals 86 are positioned between the spent fuel manifolds 18 and the ends of the solid oxide electrolyte members 42, and electrodes 40 and 44. Seals 88 are positioned between the fuel supply manifold 14 and the spent fuel collection manifold 18, and seals 90 are positioned between the spent oxidant collection manifold 20 and the oxidant supply manifold 16. These seals are porous ceramic plates which are apertured to allow the distribution members to pass therethrough. The pores of the plates are sealed with a ceramic slurry when positioned on the distribution means and the seals are sintered.

Figure 4:
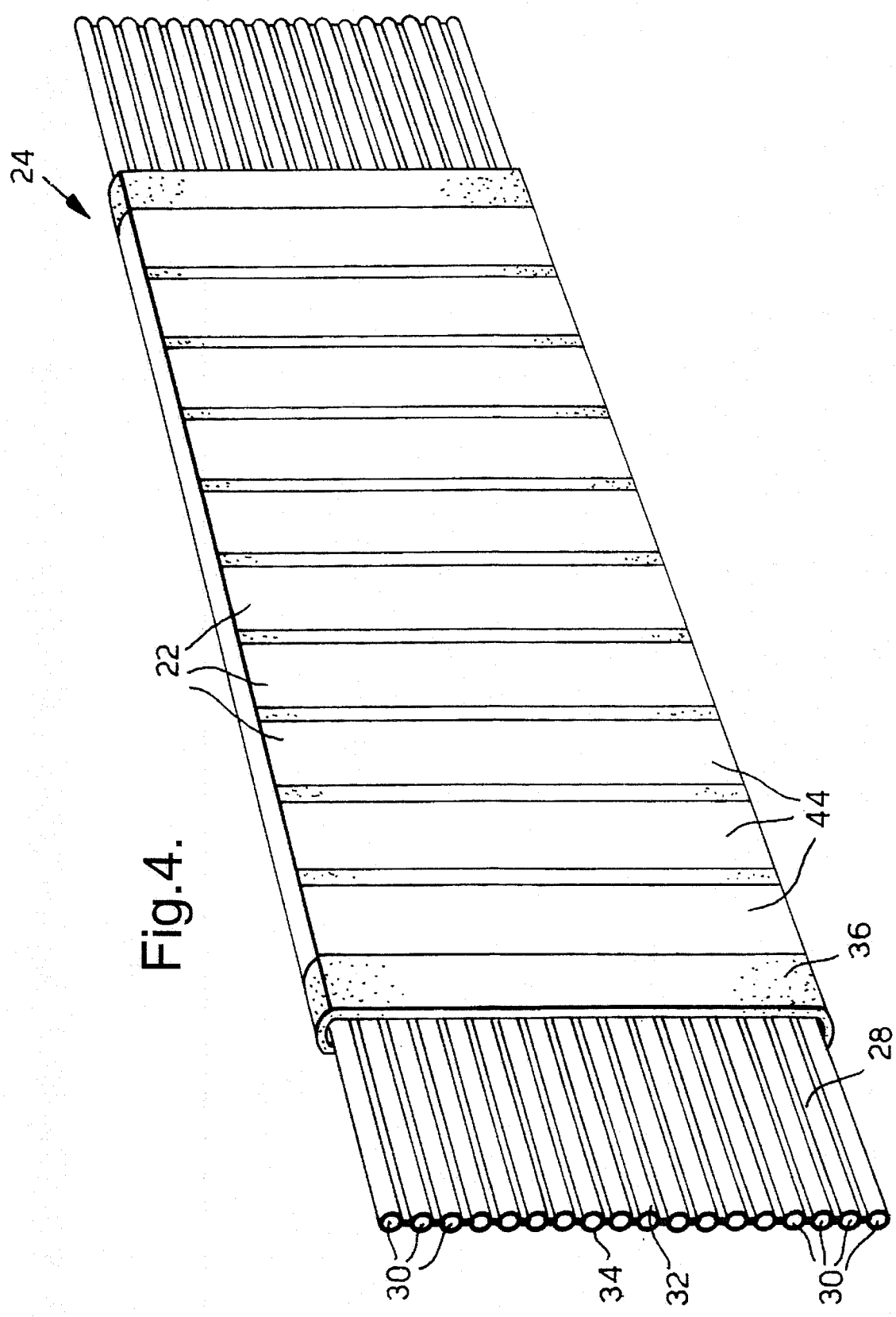
FIG. 4 is a perspective view of a module forming part of the solid oxide fuel cell stack shown in FIGS. 1, 2 and 3.
Figure 6B:
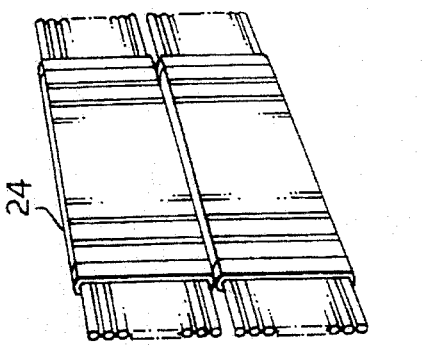
FIGS. 6A to 6D are perspective views of the assembly procedure for the solid oxide fuel cell stack.
Figure 6A:
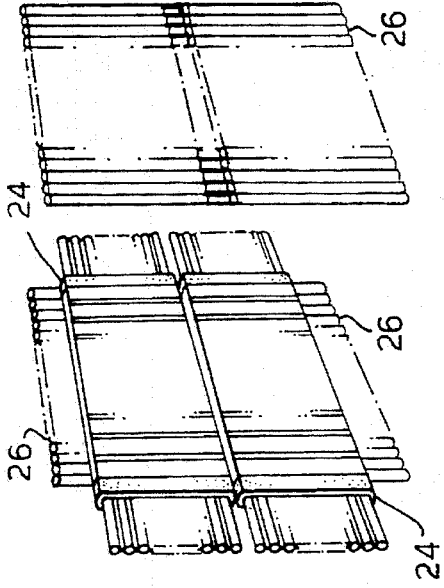
Figure 6C:
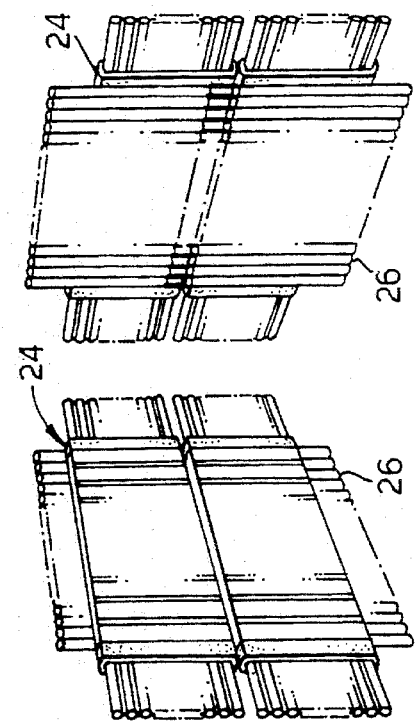
Figure 6D:
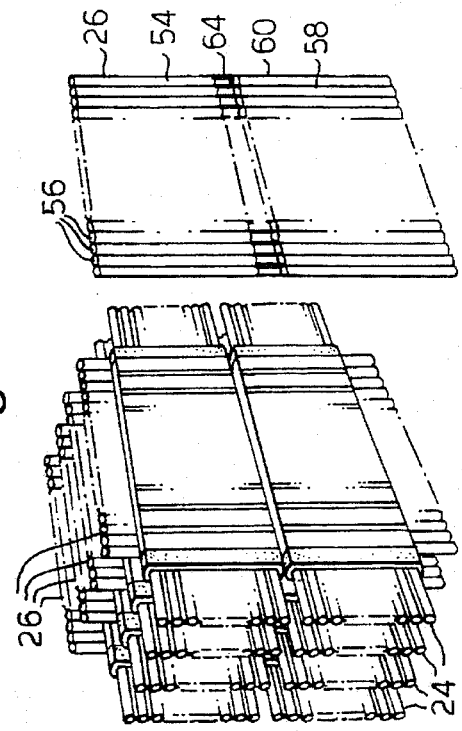
Figure 10:
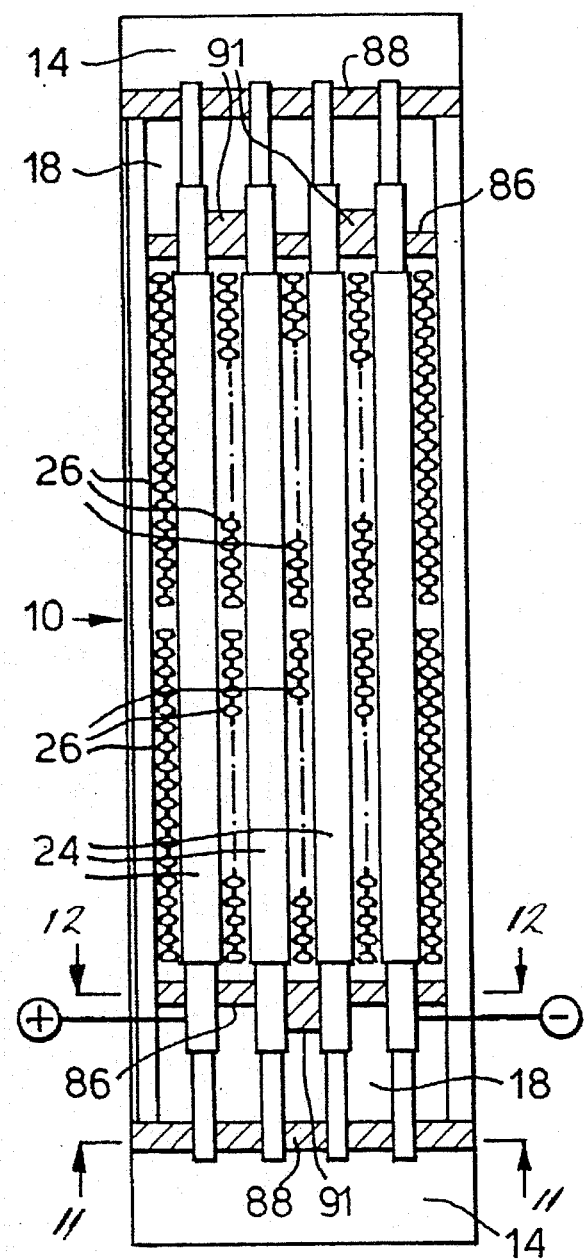
FIG. 10 is a cross-section through the core region perpendicular to FIG. 9 showing the seals and interconnectors.
Figure 11:
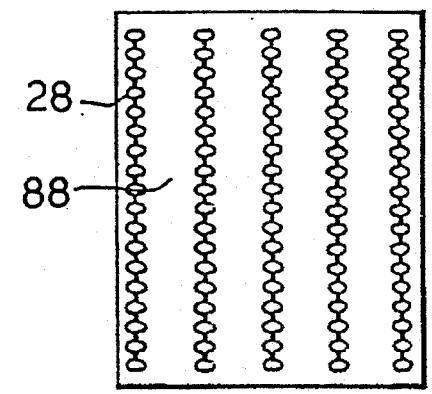
FIG. 11 is a cross-sectional view in the direction of arrows C—C in FIG. 10.
Figure 12:
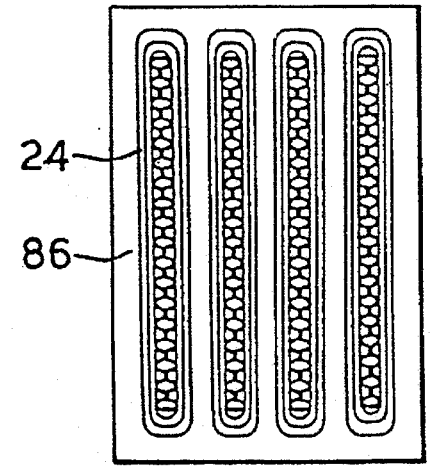
FIG. 12 is a cross-sectional view in the direction of arrows D—D in FIG. 10.
Figure 13:
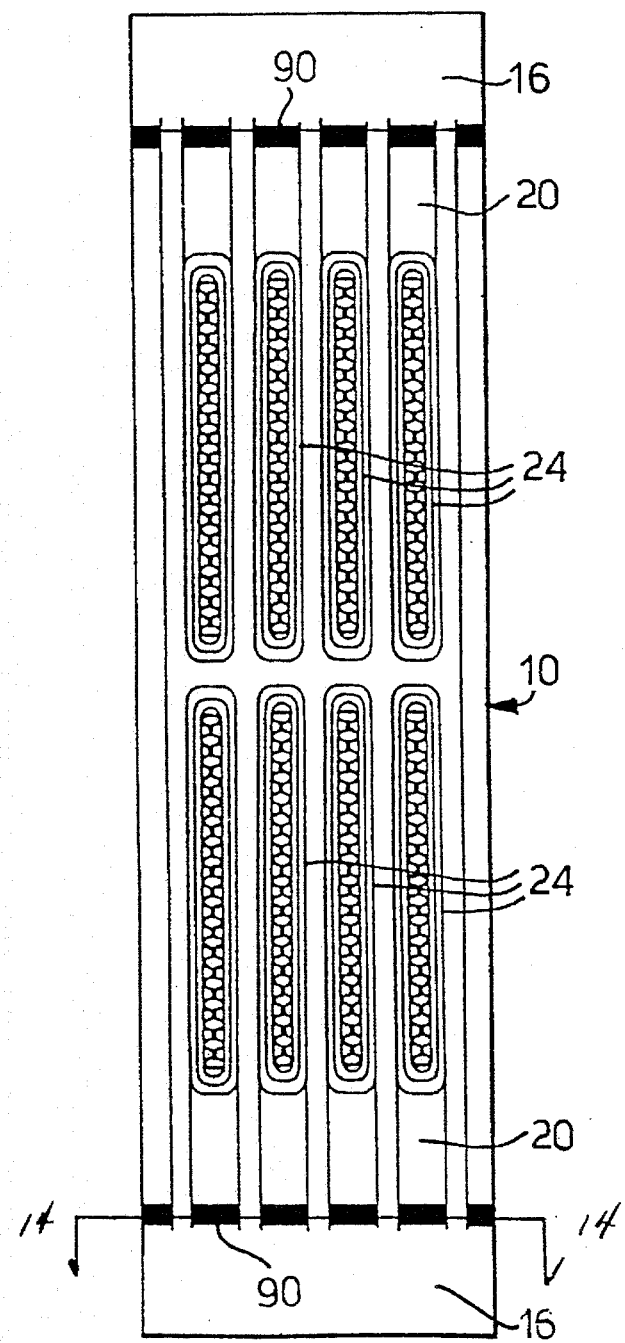
FIG. 13 is a cross-section through the core region perpendicular to FIG. 9 showing the seals and interconnectors.
Figure 14:
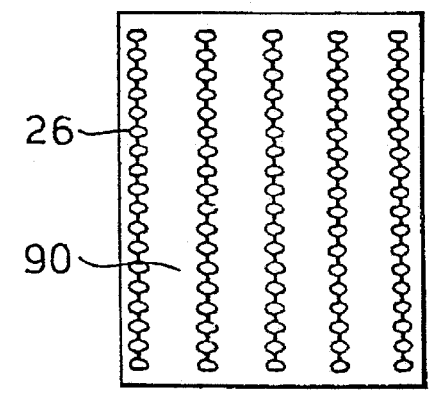
FIG. 14 is a cross-sectional view in the direction of arrows E—E in FIG. 13.

Also shown in FIGS. 4 and 10 are the terminal rings at the ends of the first distribution members 28 and the seals at the edges of the second distribution members 54, and intermodule connections 91. The terminal ring at one end of each module is an extension of an anode electrode and the terminal ring at the other end is an extension of a cathode electrode.

In operation hydrocarbon fuel is supplied through pipes 64 to the solid oxide fuel cell stack 10, and air or oxygen is supplied through pipes 80 to the solid oxide fuel cell stack 10. The hydrocarbon fuel may be gasified coal, natural gas, propane, naptha or other light hydrocarbons. The heavier hydrocarbon fuels such as kerosine, diesel and fuel oil may also be used in the two stage indirect reforming system as the highly active low temperature steam reforming catalysts provided in the prereformer break down the higher hydrocarbon components to methane, hydrogen and oxides of carbon. The hydrocarbon fuel entering the solid oxide fuel cell stack 10 is mixed with spent fuel/anode gases, which is laden with steam and sensible heat, by the action of the hydrocarbon fuel passing through the jet pumps 72 and drawing the spent fuel/anode gas from the spent fuel collection manifolds 18 though the pipes 70 into the pipes 64 downstream of the jet pumps 72. The mixture of hydrocarbon fuel and recirculated spent fuel/anode gas flows into the adiabatic catalytic prereformer 66 where a fraction of the hydrocarbon fuel is steam reformed to methane, hydrogen and carbon dioxide. The sensible heat of the recirculating spent fuel/anode gas is used to preheat the hydrocarbon fuel. The prereforming reaction is endothermic for methane and low molecular weight hydrocarbons, but is exothermic for higher molecular weight hydrocarbons, such as kerosine, due to the dominance of the exothermic methanation reactions over the endothermic reforming reactions. A low temperature reforming catalyst 68 is used in the prereformer 66 to allow the hydrocarbon fuel to be fed to the solid oxide fuel cell 10 at ambient temperatures. In the jet pumps 72 the hydrocarbon fuel mixes with hot, typically 500° to 700° C., recirculating spent fuel/anode gases, giving a mixture gas temperature of about 400° to 600° C. which matches the temperature of the prereformer catalyst. The prereformer 66 reforms approximately 5 to 20% of the hydrocarbon fuel. The prereformer catalyst 68 is tolerant to the relatively high carbon dioxide levels in the spent fuel/anode gases recirculated to the prereformer 66. The prereformer preferably contains guard means to treat and remove sulphur, chlorine and other contaminants in the hydrocarbon fuel. This is necessary to safeguard the low temperature reforming catalyst, which is particularly susceptible to poisoning. Thus the adiabatic prereformers 66 remove sulphur and chlorine containing impurities from the hydrocarbon fuel, they convert ethane and higher hydrocarbon fuels to methane, hydrogen and oxides of carbon, achieve a measure of methane prereforming to hydrogen and oxides of carbon and provide a means to start up the fuel cell stack from cold. The prereformer catalyst 68 together with its guard means is replaced periodically once critical levels of contamination are reached.

The partially reformed hydrocarbon fuel from the prereformer 66 is supplied to the first distribution members 28 via the fuel supply manifolds 14. The hydrocarbon fuel passes through the first passages 30 in the first distribution members 28 which contain a steam reforming catalyst 74 and the hydrocarbon fuel is steam reformed to hydrogen and oxides of carbon over the catalyst 74. The endothermic heating requirement of the steam reforming process in the first passages 30 of the first distribution member 28 is met by the transfer of waste heat from the solid oxide fuel cells 22 through the first distribution member 28. To reform the hydrocarbon fuel completely the gas temperature in the first passages 30 of the first distribution member 28 must be raised to 700° to 800° C. by the heat transfer from the solid oxide fuel cells 22.

The two stage indirect reforming allows ambient temperature hydrocarbon fuel gas to be fed to the solid oxide fuel cell stack. The prereformer traps hydrocarbon fuel gas impurities which may poison the high temperature steam reforming catalyst in the first distribution members and the fuel cell anodes. By avoiding steam reforming on the surfaces of the anode electrodes thermal shocking of the delicate thick film electrolyte member and electrode assemblies is avoided and carbon formation in the anode chambers, with its attendant risk of shorting the series connected fuel cells is avoided. The reforming of the higher hydrocarbons is carried out in the low temperature prereformer where the propensity for carbon formation is low. Thus the prereformer provides a clean synthesis gas to the second reforming stage in the passages of the first reactant distribution member.

To start up the solid oxide fuel cell 10 from cold and to facilitate low power operation the prereformer 66 is used to perform partial oxidation reforming. The prereformer catalyst 68 is provided with an upstream region 69 containing a catalyst which is suitable for partial oxidation reforming and steam reforming of the hydrocarbon fuel. The catalyst may include a precious metal, for example platinum or rhodium, to facilitate light-off of the partial oxidation reaction from ambient conditions. Initially a flow of ambient temperature air laden with methanol vapour is supplied through pipes 76 and through the jet pump 72 into the prereformer 66. Simultaneously air is supplied through the pipes 82 to the third passages 56 in the second distribution member 54. The partial oxidation reforming reaction for methanol takes place at room temperature in the case of the precious metal catalyst in the region 69 of the prereformer 66. The prereformer 66 starts to warm up due to the heat released by the exothermic partial oxidation of the methanol vapour. The hydrocarbon fuel is supplied through pipes 64 when the temperature of the region 69 of the prereformer 66 reaches a temperature of approximately 500° C. The partial oxidation reforming reaction for methane for example results in a greater rate of heat release than the methanol. The methanol supply through pipes 76 is then terminated.

During early stages of the warming up process for the solid oxide fuel cell stack 10 little or no conversion of the hydrocarbon fuel occurs in the fuel cells. The fuel cell temperature is too low. Thus the spent fuel/anode gas reaching passing from the spent fuel collection manifolds 18 into the spent air collection manifolds 20 is substantially a mixture of hydrogen, carbon dioxide and nitrogen. The hydrogen in the spent fuel/anode gas is combusted in the spent air collection headers 20, with consequential heating of the air stream flowing through the third passages 56 in the second distribution member 54. Thus during start up the full heating value of the hydrocarbon fuel is used to warm up the solid oxide fuel cell stack 10. Also the fuel cells may be short circuited to assist warm up of the stack. An advantage of the partial oxidation start up procedure is that any nickel oxide formed in the anodes is reduced to nickel and the steam reforming catalyst in the first passages 30 of the first distribution member 28 is reactivated by the hydrogen produced by partial oxidation reforming.

As the solid oxide fuel cell stack starts up a fraction of the spent fuel/anode gas in the spent fuel collection manifolds 18 is recirculated into the prereformer 66 by the jet pump 72. As the fuel conversion rate in the fuel cells increases, product water forms an increasing proportion of the spent fuel/anode gas. Thus as the stack heats up and the steam laden spent fuel/anode gas gets hotter the start up air supply through pipe 76 is reduced allowing steam reforming to assume a greater proportion of the overall reforming process. At an intermediate stage between partial oxidation and steam reforming, the reforming reaction is, nominally:

$$CH_4+(1-y/2)O_2+yH_2O=CO_2+(2+y)H_2$$

where y is the varying number of moles of steam reacted per mole of methane reformed. The enthalpy of this autothermal reforming reaction is:

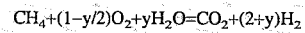

$$H=-318.7+241.8y\ kJ/mol\ CH_4$$

This reaction is endothermic for y<1.318 and endothermic for y>1.318.

The point at which the air supply through pipes 76 is shut off by the valves 78 depends upon the size of the stack and on the operational power level following warm up. If the start up air supply through pipes 76 is shut off to early and/or the operating power level is too low there will be insufficient waste heat to meet the heat losses from the stack. Therefore it will not be possible to maintain a steady operating stack temperature. Moreover the recirculating spent fuel/anode gas will contain insufficient heat to meet the endothermic requirements of steam reforming, causing a further reduction in operating temperature. Conversely, under conditions of low power operation when the internal losses in the stack are insufficient to meet the heat losses and the full endothermic heat requirements of steam reforming, the stack temperature may be maintained by allowing the stack to operate in an autothermal reforming mode, for example 0<y<2, where 1−y/2=moles $O_2$/mole $CH_4$, with a supply of air sufficient to off set the thermal deficiency.

In FIG. 7D is shown a variant where the first passages 30 of the first distribution member 28 are for the supply of oxidant to the solid oxide fuel cell stack 10. In this case the electrodes 40 on the porous support structure 36 are cathodes and the electrodes 44 on the opposite surface of the electrolyte members 42 are anodes. The third passages 56 of the second distribution member 54 are for the supply of fuel to the solid oxide fuel cell stack 10. In this case the electrodes 40 and 44 extend longitudinally relative to the first distribution member 28 and perpendicular to the second distribution member 54.

Figure 15:
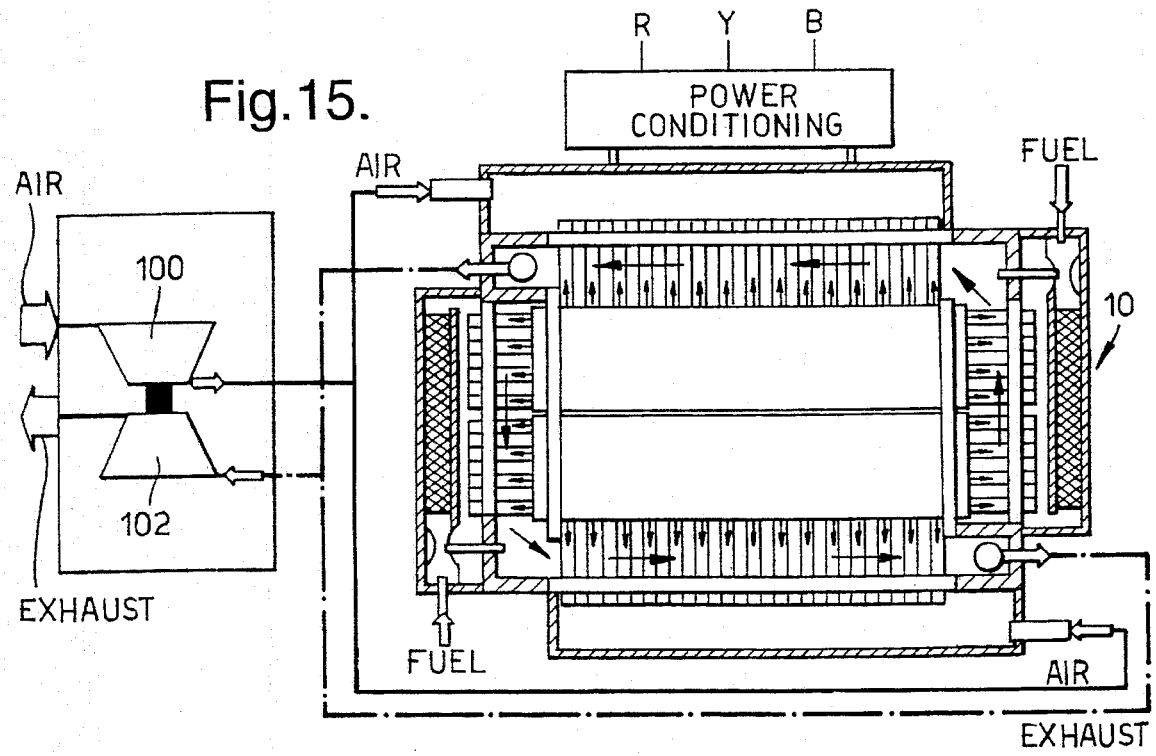
FIG. 15 is a solid oxide fuel cell stack according to the present invention in a power system.

FIG. 15 shows a solid oxide fuel cell stack 10 in which the oxidant supply is an air blower or compressor 100 driven by a reciprocatory or turbo gas expander 102 by the hot exhaust gases from the combustion of the spent fuel in the spent oxidant in the spent oxidant collection manifolds 20.

Figure 16:
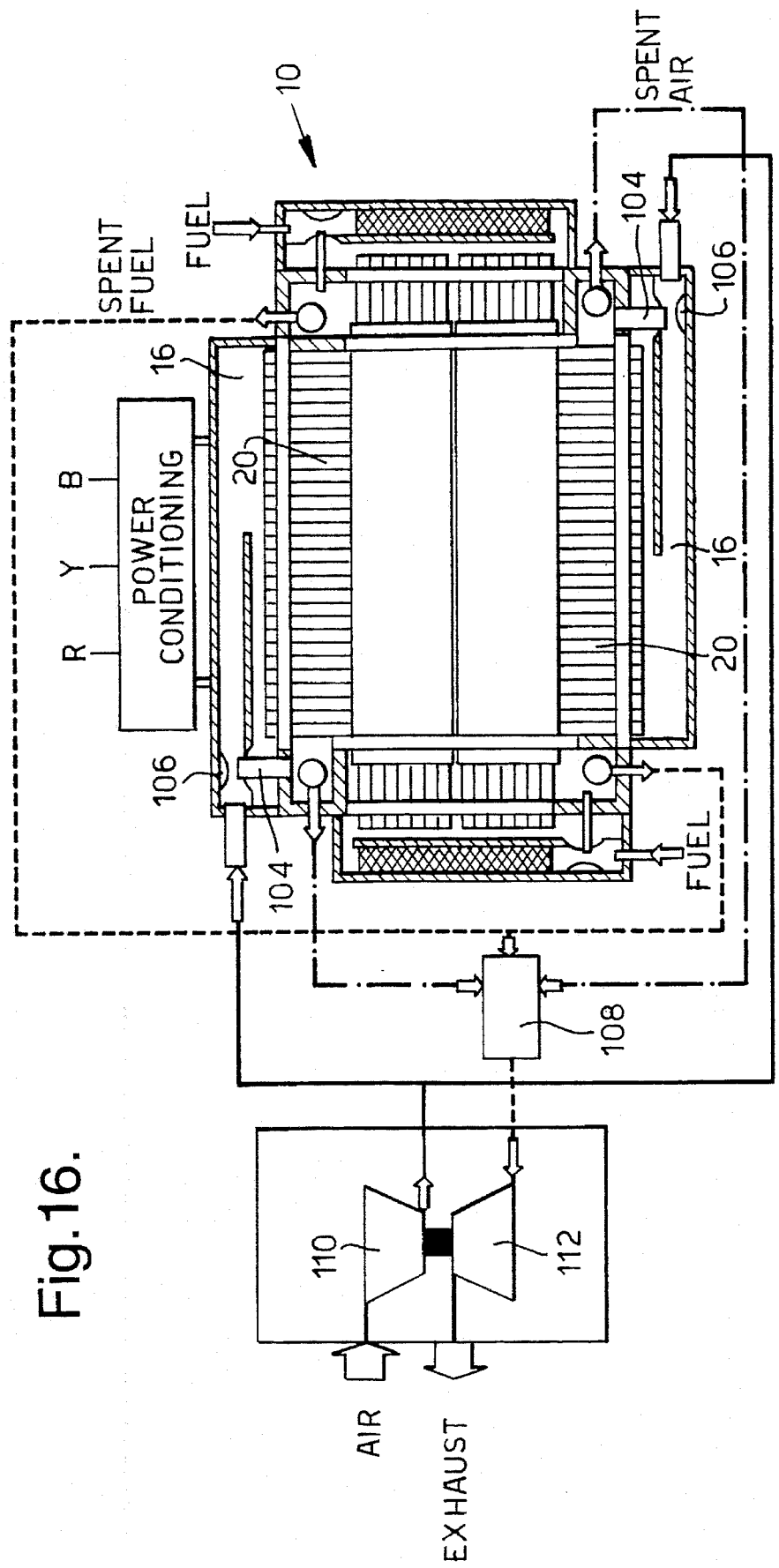
FIG. 16 is a solid oxide fuel cell stack according to the present invention in an alternative power system.

FIG. 16 shows a solid oxide fuel cell stack 10 in which ducts 104 are provided to take a portion of the spent oxidant from the spent oxidant collection manifolds 20 and recirculate the spent oxidant to the oxidant supply manifolds 16. Jet pumps 106 are provided to induce the flow of the spent oxidant into the oxidant supply manifolds and are driven by the pressure of the oxidant supplied into the oxidant supply manifolds through pipes 82. In this case the the spent fuel/anode gas is burnt in the spent oxidant in an external combustor 108. The hot gases from the combustor 108 are used to drive a reciprocatory or turbo expander 112 which in turn drives an air blower or compressor 110. The air compressor 110 supplies the air for the oxidant supply manifolds 16. The exhaust gases may also be used to preheat the air supplied to the oxidant supply manifolds 16 in an external heat exchanger (not shown).

Figure 17:
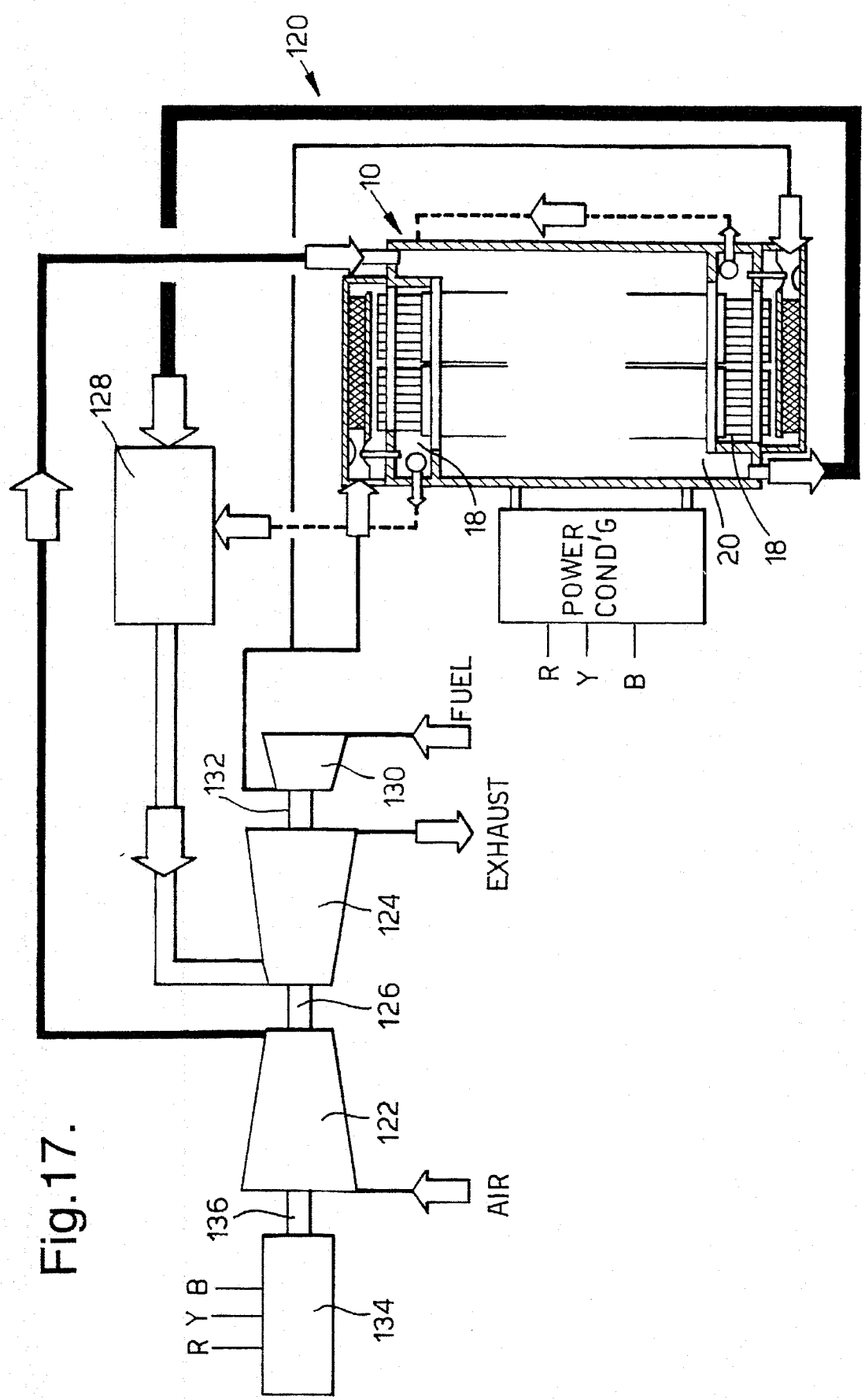
FIG. 17 is a solid oxide fuel cell stack according to the present invention in a combined solid oxide fuel cell stack and gas turbine cycle power system.

FIG. 17 shows a combined solid oxide fuel cell and gas turbine plant 120. The gas turbine comprises a compressor 122 driven by a turbine 124 via shaft 126. The spent fuel/anode gas from the spent fuel collection manifolds 18 and the spent oxidant from the spent oxidant collection manifolds 20 are supplied to an external combustor 128. The spent fuel is burnt in the spent oxidant in the combustor 128 to produce hot gases to drive the turbine 124. The compressor 122 supplies air to the oxidant supply manifolds 16 and the turbine 124 also drives a second compressor 130 via a shaft 132. The second compressor 130 supplies hydrocarbon fuel to the fuel supply manifolds 14. The turbine 124 also drives an alternator 134 via a shaft 136.

Figure 18:
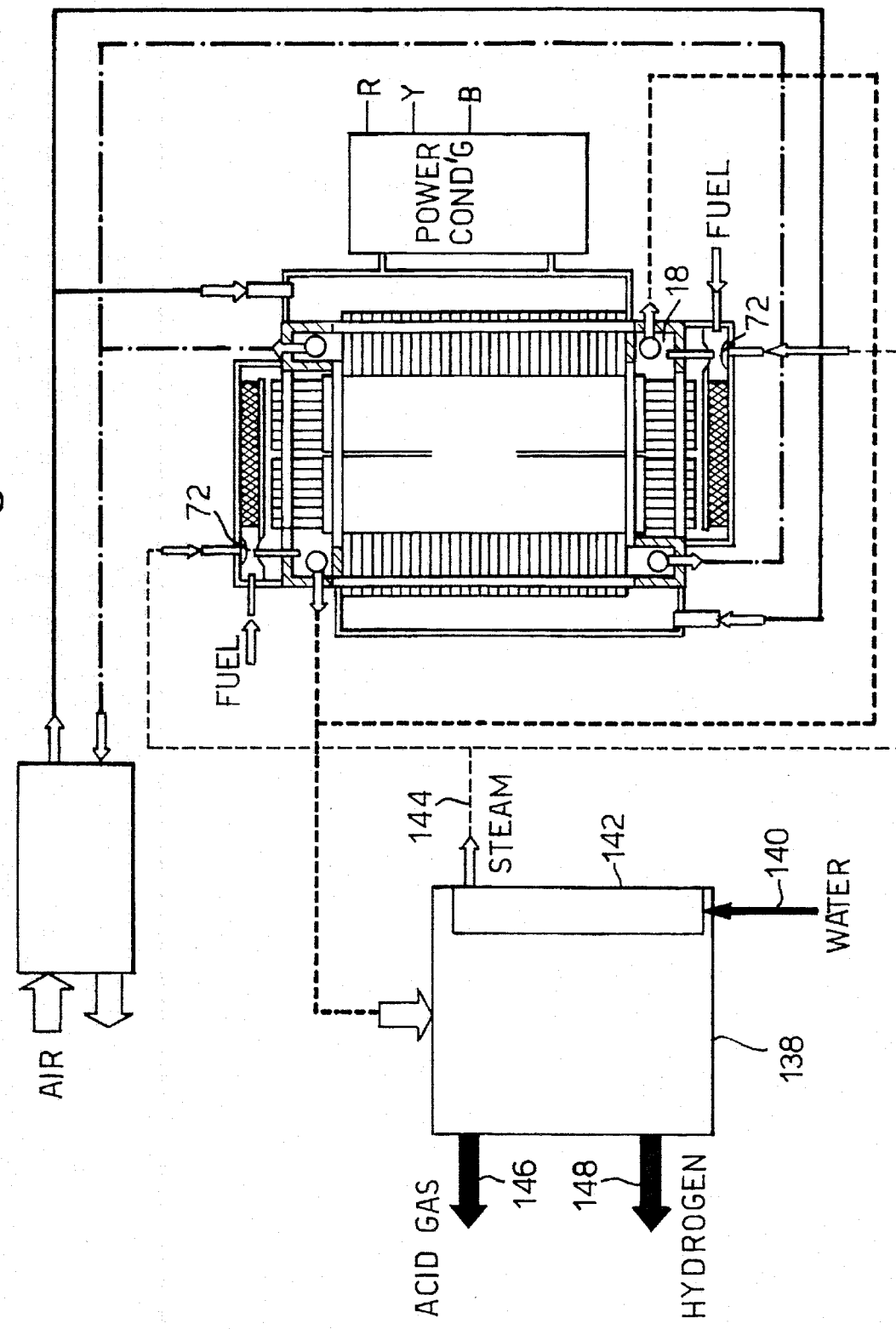
FIG. 18 is a solid oxide fuel cell stack according to the present invention in a solid oxide fuel cell stack combined hydrogen and power cogeneration system.

In FIG. 18 is a combined hydrogen and power cogeneration system in which surplus fuel supplied to the solid oxide fuel cell stack 10 is steam reformed in the two stage indirect reforming system, prereformer 66 and reformer 74, thus absorbing the waste heat from the solid oxide fuel cell stack 10 to produce a by-product synthesis gas of increased heating value. The surplus synthesis gas is passes to a water gas shift and hydrogen removal subsystem 138 where carbon monoxide and water is converted to hydrogen and the acid gases, mainly carbon dioxide, are removed. Hydrogen leaves the water gas shift and hydrogen removal subsystem 138 through pipe 148 and the acid gases leave the subsystem 138 through pipe 146. A steam generator 142 is positioned in the water gas and hydrogen removal subsystem 138, and the steam generator 142 is supplied with water via a pipe 140 and supplies additional steam, required to reform surplus fuel, to the prereformers 66 via a pipe 144. The steam generator 144 cools the synthesis gas to the lower temperature preferred for the water gas shift reaction. The prechilled steam is supplied to the jet pumps 72.

Figure 19:
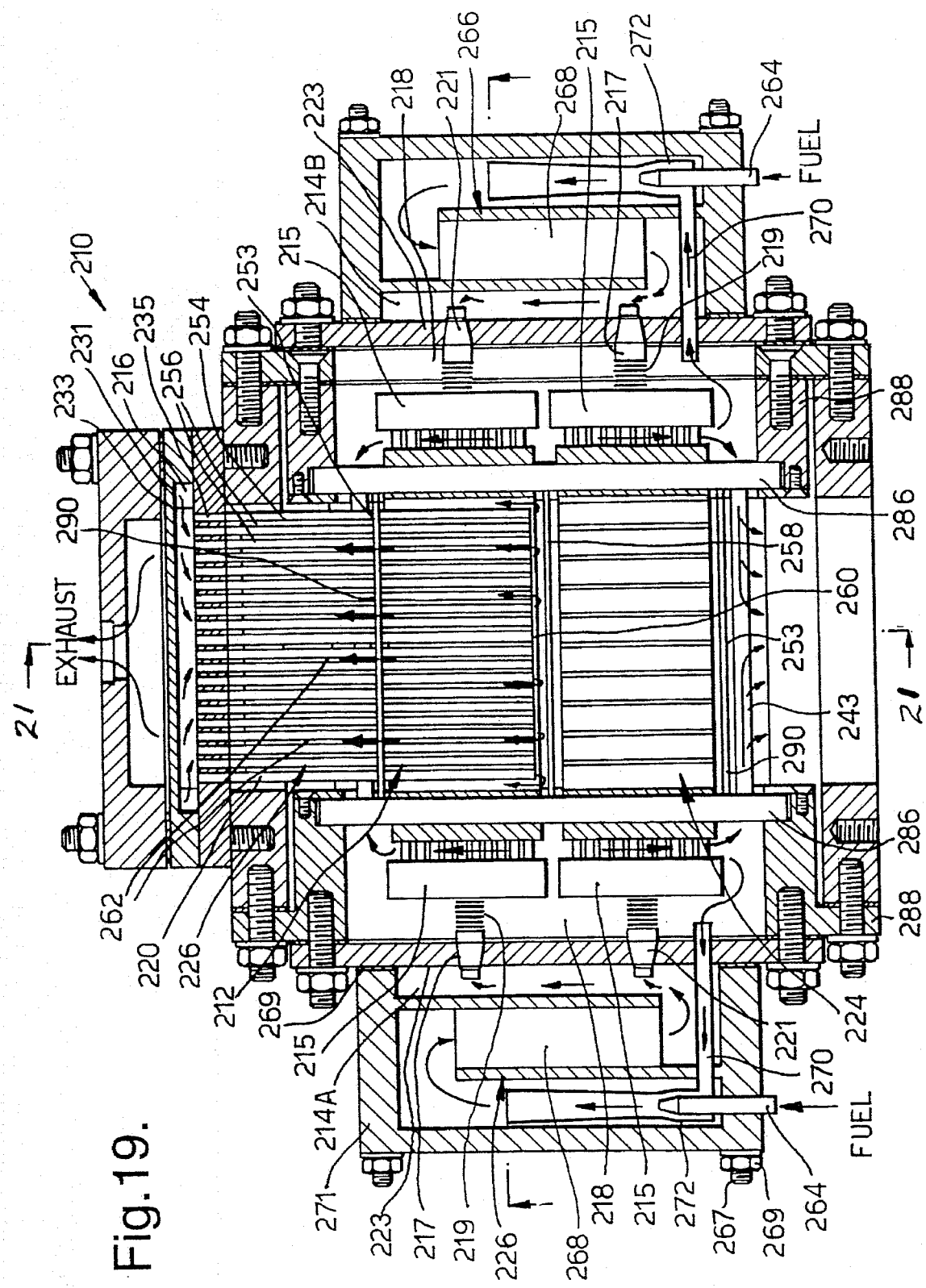
FIG. 19 is a cross-sectional view through a further solid oxide fuel cell stack according to the present invention.
Figure 20:
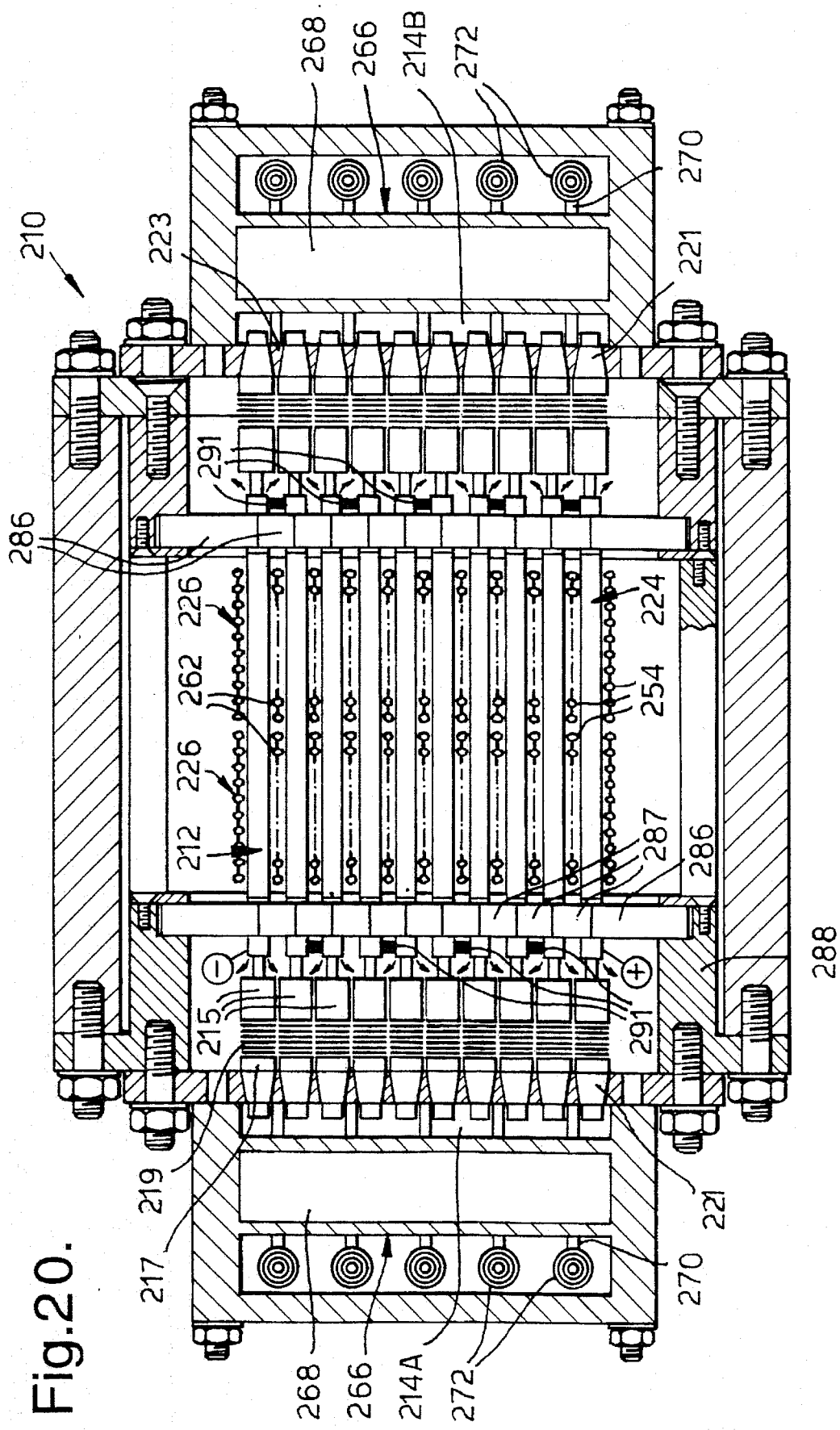
FIG. 20 is a cross-sectional view in the direction of arrows F—F in FIG. 19.
Figure 21:
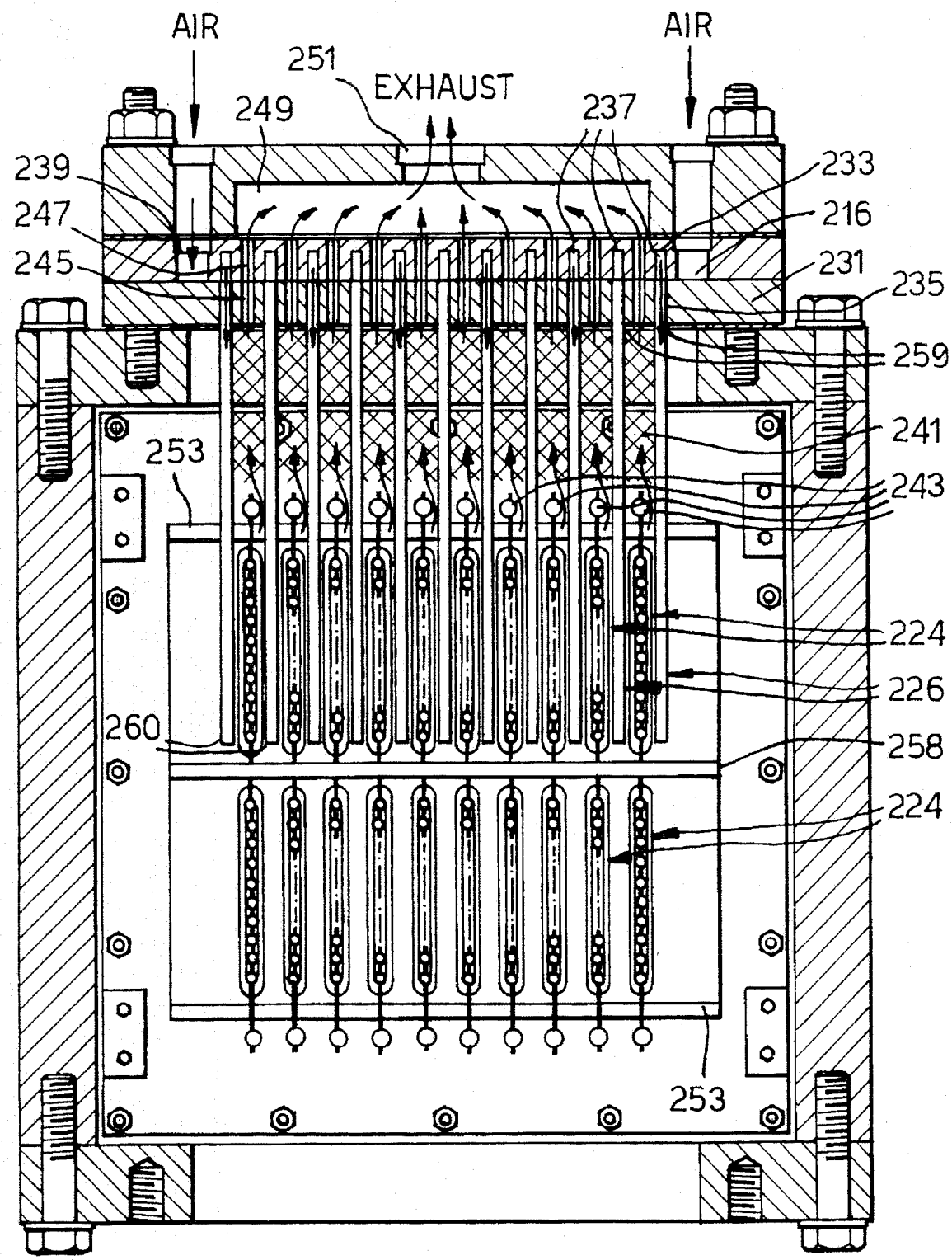
FIG. 21 is a cross-sectional view in the direction of arrows G—G in FIG. 19.

A further solid oxide fuel cell stack 210 according to the present invention is shown in FIGS. 19, 20 and 21. The solid oxide fuel cell stack 210 comprises a core region 212 which contains an array of solid oxide fuel cells 222. The core region 212 is surrounded by primary fuel supply manifolds 214, oxidant supply manifolds 216, spent fuel collection manifolds 218 and spent oxidant collection manifolds 220.

The solid oxide fuel cells 222 are carried on one or more first modules 224 as shown in FIGS. 22 to 26, which form one of the basic units from which the core region 212 of the solid oxide fuel cell stack 210 is constructed. The core region 212 also comprises one or more second modules 226 which are the other basic units of the core region 212 of the solid oxide fuel cell stack 210.

Each of the first modules 224, as shown more clearly in FIGS. 22 to 26, comprises a first reactant distribution member 228 which defines a plurality of parallel first passages 230 for the supply of a first reactant longitudinally of the first reactant distribution member 228. The axes of the first passages lie in a common plane. The first reactant distribution member 228 is most preferably manufactured from a ceramic material by extrusion of a viscous ceramic dough through suitably shaped dies, which produces parallel tubular ceramic members 232 spaced apart by integral ceramic spacing members 234, or webs, and the first reactant distribution member is then dried and sintered. The diameter of the first passages 230 is up to 10 mm, although diameters greater than this may be produced. The first reactant distribution members 228 are capable of being produced in widths of 100 mm and more, for example 150 mm, and in lengths of 1 m or more. A porous support structure 336 surrounds the first reactant distribution member 228, extends transversely of the first reactant distribution member 228 and contacts the tubular ceramic members 232 but is spaced from the spacing members 234 to define a plurality of parallel second passages 238 for the distribution of fresh first reactant and the removal of spent first reactant from the solid oxide fuel cells 222. The second passages 238 are in fact the anode, or cathode, chambers of the solid oxide fuel cell stack 210. The tubular ceramic members 232 have apertures 255 substantially midway between the ends of the first passages 230 to allow the first reactant to flow from the first passages 230 into the second passages 238 to supply the first reactant to the anode, or cathode, chambers of the solid oxide fuel cells 222.

The porous support structure 236 carries a plurality of series connected solid oxide fuel cells 222 on its two parallel flat surfaces. Each of the solid oxide fuel cells 222 comprises a first electrode 240, anode or cathode, which contacts and is supported by the porous support structure 236, a solid oxide electrolyte member 242 which contacts the first electrode 240 and a second electrode 244, cathode or anode, which contacts the solid oxide electrolyte member 242. The first electrode 240 of one solid oxide fuel cell 222 is electrically connected to the second electrode 244 of an adjacent solid oxide fuel cell 222 by an interconnector 248. Adjacent first electrodes 240 are separated by insulators or solid oxide electrolyte members 242. Each solid oxide electrolyte member 242 is approximately 1 to 50 microns thick and the first and second electrodes are approximately 25 to 250 microns thick. The porous support structure is approximately 100 to 1000 microns thick.

Each of the second modules 226, as shown in FIGS. 19, 20 and 21, comprises a second reactant distribution member 254 which defines a plurality of parallel third passages 256 for the supply of a second reactant longitudinally of the second reactant distribution member 254. The axes of the third passages 256 lie in a common plane. The second reactant distribution member 254 is also preferably manufactured from ceramic by extrusion of a viscous ceramic dough through suitably shaped dies, which produces parallel tubular ceramic members spaced apart by integral ceramic spacing members, or webs, and the second reactant distribution member is then dried and sintered. The diameter of the third passages 256 is up to 10 mm, although diameters greater than this may be produced. The second reactant distribution members 254 are capable of being produced in widths of 100 mm and more, for example 150 mm, and in lengths of 1 m or more. The second reactant distribution member 254 is in close proximity to the second electrodes 244 on the first modules 224, and the second electrodes 244 of one first module 224 contact the tubular ceramic members but is spaced from the spacing members to define a plurality of parallel fourth passages 262 for the distribution of fresh second reactant and the removal of spent second reactant from the solid oxide fuel cells 222. The fourth passages 238 are in fact the cathode, or anode, chambers of the solid oxide fuel cell stack 210. The tubular ceramic members of the second reactant distribution members 254 do not have apertures substantially midway between the ends of the third passages 256, instead the second reactant flows the full length of the third passages 256 and then reverses in direction to flow into the fourth passages 262 to supply the second reactant to the cathode, or anode, chambers of the solid oxide fuel cells 222.

Thus it can be seen, from FIG. 19, 20 and 21, that the first modules 224 are stacked alternately with two second modules 226 in the core region 212 of the solid oxide fuel cell stack 210. Thus for example there are ten first modules 224 and twenty two second modules 226. The first and second modules 224,226 are stacked such that the first and second passages 230,238 are arranged perpendicular to the third and fourth passages 256,262. It is also seen that each of the two second modules 226 between a pair of adjacent first modules 224 extends only approximately half way across the solid oxide fuel cell stack 210, and that the axes of third passages 256 of the two second modules 226 lie substantially in the same plane. Also dividers 258 are positioned between the inner ends 260 of the second modules 226 to deflect the second reactant to flow back over the outer surfaces of the second reactant distribution members 254 of the respective second modules 226. The use of second reactant distribution members 254 which extend only half way across the solid oxide fuel cell stack 210 has several advantages compared to the second reactant distribution members shown in FIG. 1 to 6. By introducing the second reactant distribution members 254 from opposite sides of the solid oxide fuel cell stack 210, it is possible to firstly stack all the the first modules 224 together in a unit in the solid oxide fuel cell stack 210 casing. The second modules 226 are then introduced into the solid oxide fuel cell stack 210 independently from opposite sides of the stack 210 between pairs of adjacent first modules 224. The second reactant distribution members 254 are only held at one end, and this allows the second reactant distribution members 254 to thermally expand/contract freely and hence reduce stresses in the second reactant distribution members 254.

It is seen that both ends of each of each first passage 230, within the first reactant distribution members 228, is supplied with first reactant, fuel. The opposite ends of the first passages 230 are supplied with fuel from respective separate secondary fuel supply manifolds 215. Both ends of each second passage 238 discharges spent first reactant into spent fuel collection manifolds 218. The spent fuel collection manifolds 218 are positioned between the primary fuel supply manifolds 214 and the core region 212. The secondary fuel supply manifolds 215 are positioned with in the spent fuel collection manifolds 218. The first reactant distribution members 228 have the spacing members 234 cut away at their ends to leave the parallel tubular ceramic members 232, which are easily located in corresponding arrays of circular holes drilled in the secondary fuel supply manifolds 215. The removal of the spacing members 234 at the ends of the first reactant distribution members 228 reduces stresses in the structure. Each of the secondary fuel supply manifolds 215 is supplied with fuel from one of the two primary fuel supply manifolds 214A,214B. Thus the secondary fuel supply manifolds 215 at one end of each first reactant distribution member 228 is supplied with fuel from one primary fuel supply manifold 214A and the secondary fuel supply manifolds 215 at the opposite end of each first reactant distribution member 228 is supplied with fuel from the other primary fuel supply manifold 214B. The secondary fuel supply manifolds 215 are connected to the primary fuel supply manifolds 214A,214B by connections which are compliant with respect to thermal differential expansion/contraction. In particular each of the secondary fuel supply manifolds 215 has a pipe 217 which has a compliant section 219. The compliant sections 219 of the pipes 217 are preferably tube-like bellows, but looped pipes or other suitable connections may be used. The secondary fuel supply manifolds 215 are fabricated from zirconia, magnesium aluminate and other suitable ceramics with a thermal expansivity to that of the first reactant distribution members 228, ferritic steel or martensitic steel with a thermal expansivity to match that of the first reactant distribution members 228. The compliant connection between the primary fuel supply manifolds 214A,214B and the secondary fuel supply manifolds 215 is intended to independently mount each of the first modules 224 so that differential thermal expansion/contraction between each of the first modules 224, its adjacent first modules 224 and the casing of the solid oxide fuel cell stack 210 does not result in excessive loads on the first modules 224 or its component parts. The ends of the pipes 217 fit into apertures 221 in the bulkheads 223 of the primary fuel supply manifolds 214A,214B. The ends of the pipes 217 are sealed to the bulkheads 223 by bonded seals, or dry impermanent seals with or without O-ring seals or gaskets. The ends of the pipes 217 are secured to the bulkheads 223 by circlips, threads and nuts or other suitable means.

One end 259 only of each third passage 256, within the second reactant distribution member 254 is supplied with second reactant, oxidant from one of the two oxidant supply manifolds 216A,216B. The other end 260 of each third passage 256 is open to allow the oxidant to flow out of the third passages 256 and to flow back over second reactant distribution members 254 through the fourth passages 262 to the spent oxidant collection manifolds 220. The ends 259 of the second reactant distribution members 254 pass through the spent oxidant collection manifolds 220A,220B on their way to the core region 212. This allows sensible heat to be recuperated from the spent reactants to the fresh reactant supplies. The oxidant supply manifolds 216 comprise two plates 231,233, the first plate 231 has the second reactant distribution members 254 bonded into a pattern of matching apertures 235, the spacing members at the ends of the second reactant distribution members 254 are removed to leave only the parallel tubular ceramic members which are fitted into the holes 235. The second plate 233 has a pattern of oxidant distribution galleries 237 which connect with the second reactant distribution members 254. The galleries 237 are supplied with oxidant from larger channels 239 around the periphery. Also the spent oxidant collection manifolds 220 are provided with off gas combustion catalyst 241 to burn the spent fuel in the spent oxidant. To facilitate the burning of the spent fuel a series of fuel sparge tubes 243 extend between the spent fuel collection manifolds 218 at opposite sides of the solid oxide fuel cell stack 210 to convey the spent fuel to the spent oxidant collection manifolds 220. The fuel sparge tubes 243 are provided with a pattern of apertures spaced across the spent oxidant collection manifolds 220 to obtain uniform mixing with the oxidant and to provide back pressure on the flow of spent fuel. The fuel sparge tubes 243 are either metallic or ceramic. The exhaust gases from the combustion of the spent fuel in the spent oxidant is exhausted from the off gas combustion catalyst 241 through a series of apertures 245 in the first plate 231 and interconnecting apertures 247 in the second plate 233 into an exhaust collection manifold 249 and thence through duct 251 to atmosphere.

This arrangement minimises the number of seals in the core region 212 of the solid oxide fuel cell stack 210, and produces a symmetric flow path distribution to obtain a counter flow arrangement between the oxidant passing through the second reactant distribution members 254 and the spent fuel and this gives a symmetric temperature distribution in the solid oxide fuel cell stack 210. The reduction in sealing components in the solid oxide fuel cell stack 210 simplifies the assembly procedure. The second reactant distribution members 254 are connected to the oxidant supply manifolds by direct bonding using a ceramic based cement, or the ends of the second reactant distribution members 254 are metallised and brazed into the oxidant supply manifolds 216. The altered gas flow path results in temperature distributions with quarter symmetry as compared to half diagonal symmetry in FIGS. 1 to 6. This leads to lower, balanced structural loads caused by thermal expansion/contraction mismatches within the solid oxide fuel cell stack 210. The counter flow arrangement in the off gas combustion catalyst 241 gives more efficient heat transfer and a one dimensional temperature profile.

There are also two oxidant restrictor plates 253 which control the flow of spent oxidant to the off gas combustion catalyst 241, this provides a back pressure on the oxidant flow across the fuel cells 222 so that it distributes itself uniformly and ensures there is no recirculation of exhaust gases into the core 212 of the solid oxide fuel cell stack 210. The oxidant restrictor plates 253 are made from a fibrous packing or perforated plate or other suitable porous structure.

The seals 286 used in the solid oxide fuel cell stack 210 are arranged to minimise the loads, both transverse and longitudinal, that are applied on the first modules 224 and to reduce leakage of oxidant from the fourth passages 256 into the spent fuel collection manifolds 218. The loads are minimised by a compliant seal and allowing the first modules 224 to move longitudinally through the seal so that the first modules 224 are allowed to expand/contract, due to temperature changes, without being unduly constrained. The preferred seals 286 comprise gland type seals. The seals 286 are positioned between the spent fuel collection manifolds 218 and the ends of the first modules 224. The gland seals are compressed fibre paper gland seals which have a filler material introduced to close the voids in the fibre paper. The filler material is introduced as a liquid/solution which consolidates upon heating to fill the voids. It is not intended to form a bonded seal. The gland seals are preferably dry and impermanent, facilitating dismantling of the solid oxide fuel cell stack 210 for maintenance purposes. The ends of the first modules 224 have metallic end pieces 213 for cooperation with the gland seals, these metallic end pieces may be the terminal rings, or end seals. A non stick barrier is provided on the metallic end pieces 213 to prevent the filler adhering to the metallic end pieces 213. The gland seals are arranged around the metallic end pieces 213 on the ends of the first modules 224. It is preferred that the seals 286 comprise an array of seal segments 287, as shown, to form a complete wall, the segments 287 are ceramic are electrically insulating and are appropriately shaped to fit between the first modules 224. The seal segments 287 placed between two adjacent first modules 224 are shaped on both their longitudinal edges to fit around a half of each end of the first modules 224. The seal segments 287 placed adjacent one first module 224 are shaped on one of their longitudinal edges to fit around a half of each end of the first modules 224. The array of seal segments 287 are held together around their extremities by a metallic frame 288. The fitting of the segments 287 and first modules 224 into the metallic frame 288 holds the gland seals compressed. The removal of the metallic frames 288 allows the first modules 224 to be removed for maintenance and service of the solid oxide fuel cell stack 210. The metallic frames 288 are spaced apart by stiffening struts so that the first modules 224 and metallic frames 288 become an independent unit. One or more of the units of first modules 224 and metallic frames 288 are assembled into stack 210. The seals 286 may comprise multiple seals with intervening passages connected to the spent oxidant collection manifolds 220, the exhaust collection manifolds 249 or off gas combustion catalyst 241. The pressure drops in the stack are arranged for the leakage to be from the spent fuel manifolds 218 to the seal passages, from the fourth passages 256 into the seal passages and from the seal passages to the spent oxidant manifolds 220.

The prereformer 266 is removably secured to the bulkheads 223 by nut and bolt connections 265,267 and seals 269 are provided between the prereformer casing 271 and the bulkheads 223. Thus the prereformers 266 and the bulkheads 223 together define the primary fuel manifolds 214A and 214B.

The stack 210 works in a similar way to that shown in FIGS. 1 to 6.

It may be possible to use the solid oxide fuel cell stack simply with hydrogen fuel. In these circumstances the recirculation of the spent hydrogen is not required and the prereformer and reforming in the hydrogen distribution member is no longer required.

It may be possible to make each of the first and second reactant distribution members from two ceramic plates which are corrugated in two perpendicular planes, such that they are substantially like an egg-box, and bonding the peaks of one plate to the troughs of the other plate. As a further alternative it may be possible to make the first and second reactant distribution members from a plurality of parallel tubular ceramic members which are spaced apart by spacers.

It may be possible to make the first and second reactant distribution members from metallic materials if materials are available to permit the solid oxide fuel cell stack operating temperatures to be reduced.

The core region 12 of the solid oxide fuel cell stack 10 is constructed from identical first modules 24 which carry the fuel cells 22. These first modules 24 are structurally independent, and provide support for the stack without the need for cross coupling between the delicate supported thick film fuel cells on adjacent first modules 24. This arrangement allows significant tolerance to global temperature differences across the stack during start up and operation. The decoupling of the core region 12 of the stack 10 allows power rating scaleability. The first and second modules 24 and 26 are amenable to manufacture by low cost ceramic fabrication techniques such as tape calendering and screen printing. There are no adjacent oxidant and fuel gas streams and seals are not required between fuel and oxidant passages. Thermal recuperation during operation is maximised within the solid oxide fuel cell stack 10, obviating the need for external fuel reforming and reactant preheating and hence requiring a simple balance of plant. The stack uses indirect internal steam reforming within the fuel supply pipes in the fuel distribution members rather than on the anode surfaces of the fuel cells. This allows the use of reforming catalysts which are less likely to produce coking than nickel cermet anodes, reducing the requirement for excess steam and the amount of anode gas recirculation. It also mitigates the thermal shock effects of the high endothermic heat requirements of steam reforming. Exothermic partial oxidation reforming is used to start up the stack. Hydrogen produced from partial oxidation reforming during start up reactivates the nickel/yttria stabilised zirconia cermets of the anodes and the steam reforming catalyst in the fuel distribution members. Use of a prereformer enables fuel to be fed to the solid oxide fuel cell stack at ambient temperature, and enable the removal of impurities from the fuel, extending the lifetime of the high temperature catalyst and fuel cell anode electrodes.

The first reactant distribution members provide the structural support for the two electrolyte/electrode assemblies carried on the two oppositely directed surfaces of the first reactant distribution members. It may be possible to provide only a single electrolyte/electrode assembly on only one of the surfaces of the first reactant distribution members.

It is clear that the first and second reactant distribution members are substantially planar, i.e. the axes of the internal passages are arranged in a plane and the electrolyte/electrode assemblies are planar and are arranged between the first and second reactant distribution members such that the first reactant distribution members, the second reactant distribution members and the electrolyte/electrode assemblies are arranged substantially parallel to each other.

We claim:

1. A solid oxide fuel cell stack comprising at least one first module and at least one second module, each first module comprising a first hollow distribution member defining a plurality of first passages internally thereof for the supply of a first reactant longitudinally relative to the first distribution member, the first distribution member having sides facing in opposite directions, at least one electrolyte/electrode assembly arranged to be carried on one side of the first distribution member, the at least one electrolyte/electrode assembly and the first distribution member defining a plurality of second passages therebetween, the second passages extending longitudinally relative to the first distribution member for the distribution of first reactant and the removal of spent first reactant, each electrolyte/electrode assembly comprising a plurality of first electrodes, a plurality of solid oxide electrolyte members and a plurality of second electrodes, each solid oxide electrolyte member being positioned between and contacting a respective one of the first electrodes and a respective one of the second electrodes to form a fuel cell, at least one interconnector to connect the first electrode of one fuel cell with the second electrode of an adjacent fuel cell, the first electrodes on each electrolyte/electrode assembly facing the first distribution member, each second module comprising a second hollow distribution member defining a plurality of third passages internally thereof for the supply of a second reactant longitudinally relative to the second distribution member, the at least one first module being arranged in proximity to the at least one second module such that the at least one electrolyte/electrode assembly and the second distribution member define a plurality of fourth passages therebetween, the fourth passages extending longitudinally relative to the second distribution member for the distribution of second reactant and the removal of spend second reactant, the second electrodes on each electrolyte/electrode assembly facing the second distribution member, means to supply first reactant to the first passages, and means to supply second reactant to the third passages;

said first and second modules each being removably disposed in said stack.

2. A solid oxide fuel cell stack as claimed in claim 1 wherein each first module has two electrode assemblies arranged to be carried on opposite sides of the first distribution member.

3. A solid oxide fuel cell stack as claimed in claim 1 wherein the first distribution member defines a plurality of parallel first passages, the axes of the parallel first passages in the first distribution member are arranged in a plane.

4. A solid oxide fuel cell stack as claimed in claim 1 wherein the first distribution member is defined by first and second corrugated plates, the first and second corrugated plates having peaks and troughs, the troughs of the first corrugated plate are bonded to the peaks of the second corrugated plate to define the first passages, at least one of the corrugated plates has apertures extending therethrough to supply reactant from the first passages to the respective electrodes.

5. A solid oxide fuel cell stack as claimed in claim 1 wherein the first distribution member is defined by a plurality of parallel tubes to define the first passages, the tubes are interconnected by spacing members, the tubes have apertures extending therethrough to supply reactant from the first passages to the respective electrodes.

6. A solid oxide fuel cell stack as claimed in claim 4 or claim 5 wherein the apertures are midway between the ends of the passages of the first distribution members.

7. A solid oxide fuel cell stack as claimed in claim 1 wherein the first distribution member is defined by a plurality of parallel tubes to define the first passages, the tubes are interconnected by spacing members.

8. A solid oxide fuel cell stack as claimed in claim 1 wherein the first distribution member is formed from a ceramic material.

9. A solid oxide fuel cell stack as claimed in claim 1 wherein each first module includes a porous support structure extending transversely around the first distribution member, the porous support structure contacting the first distribution member at transversely spaced locations of the first distribution member to define the plurality of second passages between the first distribution member and the porous support structure, the porous support structure carrying the at least one electrolyte/electrode assembly, the first electrodes being arranged on and contacting the porous support structure.

10. A solid oxide fuel cell stack as claimed in claim 9 wherein the first electrodes are arranged on substantially parallel surfaces of the porous support structure, the first electrodes on each of the parallel surfaces of the porous support structure are connected electrically in series to the second electrode of an adjacent fuel cell.

11. A solid oxide fuel cell stack as claimed in claim 10 wherein the fuel cells on the two parallel surfaces of the porous support structure are connected electrically in parallel.

12. A solid oxide fuel cell stack as claimed in claim 1 wherein the first electrodes, the solid electrolyte members and the second electrodes extend transversely of the first distribution member, the adjacent first electrodes are spaced apart longitudinally of the first distribution member.

13. A solid oxide fuel cell stack as claimed in claim 1 wherein the first electrodes, the solid electrolyte members and the second electrodes extend longitudinally of the first distribution member, the adjacent first electrodes are be spaced apart transversely of the first distribution member.

14. A solid oxide fuel cell stack as claimed in claim 1 wherein the first electrodes are anodes and the second electrodes are cathodes.

15. A solid oxide fuel cell stack as claimed in claim 1 wherein the solid oxide fuel cell stack comprises a plurality of first modules and a plurality of second modules, the first and second modules being arranged alternately.

16. A solid oxide fuel cell stack as claimed in claim 1 wherein the solid oxide fuel cell stack comprises a plurality of first modules and a plurality of second modules, each second module being arranged alternately with two first modules.

17. A solid oxide fuel cell stack as claimed in claim 1 wherein the first and second distribution members are arranged such that the first and third passages extend perpendicularly.

18. A solid oxide fuel cell stack as claimed in claim 1 wherein the first passages have ends at the opposite ends of the first distribution member, each first module has means to supply first reactant to both ends of the first passages.

19. A solid oxide fuel cell stack as claimed in claim 1 wherein the third passages have ends at the opposite ends of the second distribution member, each second module has means to supply second reactant to both ends of the third passages.

20. A solid oxide fuel cell stack as claimed in claim 18 wherein both ends of the first passages of each first module are supplied with fuel from a pair of secondary first reactant manifolds, the secondary first reactant manifolds are connected to opposite ends of the first passages.

21. A solid oxide fuel cell stack as claimed in claim 20 wherein each secondary first reactant manifold is connected to a primary first reactant manifold.

22. A solid oxide fuel cell stack as claimed in claim 21 wherein each secondary first reactant manifold is connected to the primary first reactant manifold by a compliant connection.

23. A solid oxide fuel cell stack as claimed in claim 22 wherein the compliant connection comprises a pipe having a tube like bellow portion.

24. A solid oxide fuel cell stack as claimed in claim 1 wherein the opposite ends of the first modules are located in compliant seals which allow the first modules to move longitudinally.

25. A solid oxide fuel cell stack as claimed in claim 24 wherein both of the compliant seals comprises a plurality of seal segments, each seal segment is shaped on at least one edge to fit around the opposite ends of one or more first modules.

26. A solid oxide fuel cell stack as claimed in claim 25 wherein the seal segments of each compliant seal are located in a respective removable frame.

27. A solid oxide fuel cell stack as claimed in claim 24 wherein the compliant seals comprise gland type seals between the ends of the first modules and the seal segments.

28. A solid oxide fuel cell stack as claimed in claim 1 wherein the supply of first reactant is a supply of hydrogen containing gas and the supply of second reactant is a supply of oxygen containing gas.

29. A solid oxide fuel cell stack as claimed in claim 1 wherein the second distribution member is defined by first and second corrugated plates, the first and second corrugated plates having peaks and troughs, the troughs of the first corrugated plate are bonded to the peaks of the second corrugated plate to define the third passages, at least one of the corrugated plates has apertures extending therethrough to supply second reactant from the third passages to the respective electrodes.

30. A solid oxide fuel cell stack as claimed in claim 1 wherein the second distribution member is defined by a plurality of spaced parallel tubes to define the third passages, the tubes are interconnected by spacing members.

31. A solid oxide fuel cell stack as claimed in claim 1 wherein the second distribution member defines a plurality of parallel third passages, the axes of the parallel third passages in the second distribution member are arranged in a plane.

32. A solid oxide fuel cell stack as claimed in claim 9 wherein the porous support structure of each first module has two electrolyte/electrode assemblies arranged to be carried on opposite sides of the porous support structure, each of the porous support structures has two longitudinally extending edges, each edge of the porous support structures has a sealant to form a gas tight boundary with the electrolyte/electrode assemblies around the first distribution members.

33. A solid oxide fuel cell stack as claimed in claim 1 wherein the first electrodes have a thickness in the range 25 to 250 microns, the second electrodes have a thickness in the range 25 to 250 microns and the solid oxide electrolyte members have a thickness in the range 1 to 50 microns.

34. A solid oxide fuel stack as claimed in claim 9 wherein the porous support structure has a thickness in the range of 100 to 1000 microns.

35. A solid oxide fuel cell stack as claimed in claim 1 wherein the diameter of the first passages is up to 10 mm and the diameter of the third passages is up to 10 mm.

36. A solid oxide fuel cell stack as claimed in claim 1 wherein the third passages have first and second ends at the opposite ends of the second distribution member, each second module has means to supply second reactant to the first ends of the third passages with the second ends discharging the second reactant.

37. A solid oxide fuel cell stack as claimed in claim 36 wherein each second module is located between a pair of first modules, two second modules are arranged such that the axes of the third passages of the two second modules lie substantially in the same plane and a divider member is positioned between the second ends of the third passages to deflect the reactant to flow over the outer surfaces of the second modules.

38. A solid oxide fuel cell stack as claimed in claim 1 wherein the second passages supply spent first reactant to a spent first reactant collection manifold and the fourth passages supply spent second reactant to a spent second reactant collection manifold.

39. A solid oxide fuel cell stack as claimed in claim 38 comprising means to recirculate spent first reactant from the spent first reactant collection manifold to the means to supply first reactant.

40. A solid oxide fuel cell stack as claimed in claim 38 comprising means to recirculate spent second reactant from the spent second reactant collection manifold to the means to supply second reactant.

41. A solid oxide fuel cell stack as claimed in claim 39 or claim 40 in which the means to recirculate spent reactants comprises a jet pump.

42. A solid oxide fuel cell stack as claimed in claim 38 comprising means to supply spent first reactant from the spent first reactant collection manifold to the spent second reactant collection manifold and the spent second reactant collection manifold having a combustion catalyst to burn the spent first reactant and spent second reactant.

43. A solid oxide fuel cell stack comprising at least one first module and at least one second module, each first module comprising a first hollow distribution member defining a plurality of first passages internally thereof for the supply of a first reactant longitudinally relative to the first distribution member, the first distribution member having sides facing in opposite directions, at least one electrolyte/electrode assembly arranged to be carried on one side of the first distribution member, the at least one electrolyte/electrode assembly and the distribution member defining a plurality of second passages therebetween, the second passages extending longitudinally relative to the first distribution member for the distribution of first reactant and the removal of spent first reactant, each electrolyte/electrode assembly comprising a plurality of first electrodes, a plurality of solid oxide electrolyte members and a plurality of second electrodes, each solid oxide electrolyte member being positioned between and contacting a respective one of the first electrodes and a respective one of the second electrodes to form a fuel cell, at least one interconnector to connect the first electrode of one fuel cell with the second electrode of an adjacent fuel cell, the first electrodes on each electrolyte/electrode assembly facing the first distribution member, each second module comprising a second hollow distribution member defining a plurality of third passages internally thereof for the supply of a second reactant longitudinally relative to the second distribution member, the at least one first module being arranged in proximity to the at least one second module such that the at least one electrolyte/electrode assembly and the second distribution member define a plurality of fourth passages therebetween, the fourth passages extending longitudinally relative to the second distribution member for the distribution of second reactant and the removal of spend second reactant, the second electrodes on each electrolyte/electrode assembly facing the second distribution member, means to supply first reactant to the first passages, and means to supply second reactant to the third passages;

said first and second modules each being independently mounted in said stack so that said first and second modules are free to move relative to each other as a result of expansion and contraction.

* * * * *